(12) United States Patent
Purnhagen et al.

(10) Patent No.: US 9,502,046 B2
(45) Date of Patent: Nov. 22, 2016

(54) CODING OF A SOUND FIELD SIGNAL

(71) Applicants: DOLBY LABORATORIES LICENSING CORPORATION, San Francisco, CA (US); DOLBY INTERNATIONAL AB, Amsterdam Zuidoost (NL)

(72) Inventors: Heiko Purnhagen, Sundbyberg (SE); Leif Jonas Samuelsson, Sundbyberg (SE); Janusz Klejsa, Bromma (SE); Lars Villemoes, Järfälla (SE); Toni Hirvonen, Stockholm (SE); Glenn N. Dickins, Como (AU); Richard James Cartwright, Killara (AU)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 14/421,132

(22) PCT Filed: Sep. 20, 2013

(86) PCT No.: PCT/EP2013/069607
§ 371 (c)(1),
(2) Date: Feb. 11, 2015

(87) PCT Pub. No.: WO2014/044812
PCT Pub. Date: Mar. 27, 2014

(65) Prior Publication Data
US 2015/0221313 A1    Aug. 6, 2015

Related U.S. Application Data

(60) Provisional application No. 61/703,857, filed on Sep. 21, 2012, provisional application No. 61/703,861, filed on Sep. 21, 2012, provisional application No. 61/703,855, filed on Sep. 21, 2012.

(51) Int. Cl.
*G10L 19/012* (2013.01)
*G10L 19/008* (2013.01)
(Continued)

(52) U.S. Cl.
CPC .......... *G10L 19/012* (2013.01); *G10L 19/008* (2013.01); *G10L 19/0208* (2013.01);
(Continued)

(58) Field of Classification Search
CPC ...................................................... G10L 19/008
See application file for complete search history.

(56) References Cited

U.S. PATENT DOCUMENTS

| | | |
|---|---|---|
| 4,949,383 A | 8/1990 | Koh |
| 5,651,090 A | 7/1997 | Moriya |

(Continued)

FOREIGN PATENT DOCUMENTS

| | | | | |
|---|---|---|---|---|
| DE | WO 2012072798 A1 * | 6/2012 | ............ | G10L 19/02 |
| EP | 1873753 | 1/2008 | | |

(Continued)

OTHER PUBLICATIONS

Pomberger, Hannes, Franz Zotter, and A. Sontacchi. "An ambisonics format for flexible playback layouts." Proc. 1st Ambisonics Symposium. 2009.*

(Continued)

*Primary Examiner* — Brian Albertalli

(57) ABSTRACT

A method for encoding sound field signals includes allocating coding rate by application of a uniform criterion to all subbands of all signals in a joint process. An allocation criterion may be based on a comparison, in a given subband, between a spectral envelope of the signals to be encoded and a coding noise profile, wherein the noise profile may be a sum of a noise shape and a noise offset, which noise offset is computed on the basis of the coding bit budget. The rate allocation process may be combined with an energy-compacting orthogonal transform, for which there is proposed a parameterization susceptible of efficient coding and having adjustable directivity. In a further aspect, the invention provides a corresponding decoding method.

20 Claims, 15 Drawing Sheets

(51) Int. Cl.
- *H04M 3/56* (2006.01)
- *G10L 21/0208* (2013.01)
- *G10L 19/032* (2013.01)
- *G10L 19/02* (2013.01)
- *G10L 21/0216* (2013.01)

(52) U.S. Cl.
CPC ......... *G10L19/032* (2013.01); *G10L 21/0208* (2013.01); *H04M 3/56* (2013.01); *G10L 19/02* (2013.01); *G10L 21/0216* (2013.01)

(56) References Cited

U.S. PATENT DOCUMENTS

| | | | |
|---|---|---|---|
| 5,815,097 A | 9/1998 | Schwartz | |
| 6,591,241 B1 | 7/2003 | Absar | |
| 6,615,169 B1 | 9/2003 | Ojala et al. | |
| 6,751,477 B1 | 6/2004 | Alperovich | |
| 6,802,035 B2 | 10/2004 | Catreux | |
| 7,283,957 B2 | 10/2007 | Minde | |
| 7,420,935 B2 | 9/2008 | Virolainen | |
| 7,432,950 B2 | 10/2008 | Deleam | |
| 7,590,181 B2 | 9/2009 | Awad | |
| 7,593,032 B2 | 9/2009 | Civanlar | |
| 7,656,948 B2 | 2/2010 | Seong | |
| 7,991,238 B2 | 8/2011 | Malvar | |
| 8,036,904 B2 | 10/2011 | Myburg | |
| 8,050,914 B2 | 11/2011 | Schmidt | |
| 8,103,006 B2 | 1/2012 | McGrath | |
| 8,271,276 B1 | 9/2012 | Muesch | |
| 8,626,503 B2 | 1/2014 | Schuijers | |
| 2002/0128826 A1 | 9/2002 | Kosaka | |
| 2003/0215013 A1 | 11/2003 | Budnikov | |
| 2005/0013309 A1 | 1/2005 | Ravishankar | |
| 2005/0080616 A1* | 4/2005 | Leung | H04R 5/027 704/200.1 |
| 2005/0249277 A1 | 11/2005 | Ratakonda | |
| 2006/0007914 A1 | 1/2006 | Chandra | |
| 2006/0013416 A1 | 1/2006 | Truong | |
| 2006/0018378 A1 | 1/2006 | Piccinelli | |
| 2006/0085200 A1 | 4/2006 | Allamanche | |
| 2007/0291951 A1 | 12/2007 | Faller | |
| 2008/0068446 A1 | 3/2008 | Barkley | |
| 2008/0101466 A1 | 5/2008 | Swenson | |
| 2008/0140396 A1 | 6/2008 | Grosse-Schulte | |
| 2008/0158339 A1 | 7/2008 | Civanlar | |
| 2008/0255832 A1 | 10/2008 | Goto | |
| 2009/0083044 A1 | 3/2009 | Briand | |
| 2009/0083045 A1 | 3/2009 | Briand | |
| 2009/0295905 A1 | 12/2009 | Civanlar | |
| 2009/0296958 A1 | 12/2009 | Sugiyama | |
| 2010/0042747 A1 | 2/2010 | Hascalovici | |
| 2010/0063828 A1 | 3/2010 | Ishikawa | |
| 2010/0169080 A1 | 7/2010 | Tsuchinaga | |
| 2010/0191536 A1 | 7/2010 | Sampat | |
| 2010/0198589 A1 | 8/2010 | Ishikawa | |
| 2010/0229210 A1 | 9/2010 | Sharp | |
| 2010/0293584 A1 | 11/2010 | Civanlar | |
| 2010/0322429 A1 | 12/2010 | Norvell | |
| 2010/0329466 A1* | 12/2010 | Berge | H04R 3/12 381/22 |
| 2011/0035212 A1 | 2/2011 | Briand | |
| 2011/0039506 A1 | 2/2011 | Lindahl | |
| 2011/0063407 A1 | 3/2011 | Wang | |
| 2011/0093276 A1 | 4/2011 | Raemoe | |
| 2011/0153816 A1 | 6/2011 | Lloyd | |
| 2011/0154417 A1 | 6/2011 | Civanlar | |
| 2011/0224994 A1 | 9/2011 | Norvell | |
| 2011/0274156 A1 | 11/2011 | Mighani | |
| 2011/0295598 A1 | 12/2011 | Yang | |
| 2012/0057715 A1 | 3/2012 | Johnston | |
| 2012/0082319 A1 | 4/2012 | Jot | |
| 2012/0101826 A1 | 4/2012 | Visser | |
| 2012/0155653 A1* | 6/2012 | Jax | G10L 19/008 381/22 |
| 2013/0177168 A1* | 7/2013 | Inha | H04N 5/602 381/92 |
| 2013/0315402 A1* | 11/2013 | Visser | G10L 19/00 381/18 |
| 2014/0133660 A1* | 5/2014 | Jax | G10L 21/00 381/17 |

FOREIGN PATENT DOCUMENTS

| | | |
|---|---|---|
| WO | 2006/107833 | 10/2006 |
| WO | 2007/035147 | 3/2007 |
| WO | 2009/068083 | 6/2009 |
| WO | 2011/071610 | 6/2011 |
| WO | 2012/058229 | 5/2012 |

OTHER PUBLICATIONS

Zotter, Franz, Hannes Pomberger, and Markus Noisternig. "Ambisonic decoding with and without mode-matching: A case study using the hemisphere." Proc. of the 2nd International Symposium on Ambisonics and Spherical Acoustics. vol. 2. 2010.*

Sun, Haohai, Shefeng Yan, and U. Peter Svensson. "Optimal higher order ambisonics encoding with predefined constraints." Audio, Speech, and Language Processing, IEEE Transactions on 20.3 (2012): 742-754.*

Hellerud, Erik, Audun Solvang, and U. Peter Svensson. "Spatial redundancy in Higher Order Ambisonics and its use for lowdelay lossless compression." Acoustics, Speech and Signal Processing, 2009. ICASSP 2009. IEEE International Conference on. IEEE, 2009.*

Cheng, Bin, Christian Ritz, and Ian Burnett. "A spatial squeezing approach to ambisonic audio compression." Acoustics, Speech and Signal Processing, 2008. ICASSP 2008. IEEE International Conference on. IEEE, 2008.*

Burnett, Ian, et al. "Encoding Higher Order Ambisonics with AAC." Audio Engineering Society Convention 124. Audio Engineering Society, 2008.*

Ahrens, Jens, and Sascha Spors. "Rendering of virtual sound sources with arbitrary directivity in higher order ambisonics." Audio Engineering Society Convention 123. Audio Engineering Society, 2007.*

Tzagkarakis, C. et al "A Multichannel Sinusoidal Model Applied to Spot Microphone Signals for Immersive Audio" IEEE Transactions on Audio, Speech and Language Processing, v. 17, No. 8, p. 1483-1497, Nov. 2009.

Yang, D. et al "High-Fidelity Multichannel Audio Coding with Karhunen-Loeve Transform", IEEE Transactions on Speech and Audio Processing, New York, USA, vol. 11, No. 4, Jul. 1, 2003, pp. 365-380.

Briand, Manuel "Etudes D'Algorithmes D'Extraction des Informations de Spatialisation Sonore: Application Aux Formats Multicanaux" Mar. 20, 2007, pp. 1-240.

Faller, C. et al. "Directional Audio Coding: Filterbank and STFT-Based Design", AES Convention May 20, 2006, New York, USA.

Duval, Benjamin "Etudes de Techniques d'Extraction de l'information spatiale dans une scene sonore multicanal" Sep. 30, 2006, pp. 1-72.

Elfitri, I. et al. "Multichannel Audio Coding Based on Analysis by Synthesis" Proceedings of the IEEE, Apr. 2011, vol. 9, Issue 4.

Beack, S. et al "Spatial Cue Based Sound Scene Control for MPEG Surround", Aug. 8, 2007, IEEE Multimedia and Expo. pp. 1886.

Boakye, Kofi Agyeman "Audio Segmentation for Meetings Speech Processing" May 2009, EECS Department of University of California.

Seefeldt, Alan "Loudness Domain Signal Processing" AES presented at the 123rd Convention, Oct. 5-8, 2007, New York, USA.

Robinson, C.Q. et al. "Dynamic Range Control Via Metadata" AES presented at the 107th Convention, New York, USA Sep. 24-27, 1999.

Herre, J. et al "Interactive Teleconferencing Combining Spatial Audio Object Coding and DirAC Technology", AES Convention, May 2010.

(56) References Cited

OTHER PUBLICATIONS

DVB Organization: "CM-AVC006 Summary of Enhanced AC-3" Digital Video Broadcasting, May 27, 2004, p. 4.
Chandra, S. P et al "Audio Mixer for Multi-Party Conferencing in VoIP" IEEE International Conference on Internet Multimedia Services Architecture and Applications, Dec. 9, 2009, pp. 1-6.
Pulkki, V. et al "Directional Audio Coding Perception-based Reproduction of Spatial Sound" International Workshop on the Principles and Applications of Spatial Hearing, Nov. 11-13, 2009, Zao, Miyagi, Japan.
Samanta, V. et al "Impact of Video Encoding Parameters on Dynamic Video Transcoding" First International Conference on Communication System Software and Middleware, Jan. 8-12, 2006, New Delhi, India, pp. 1-9.
Jammeh, E. et al "Smoothing Transcoded MPEG-1 Video Streams for Internet Transmission" IEEE Proceedings on Vision, Image and Signal Processing, vol. 151, Issue 4, published on Aug. 30, 2004, pp. 298-305.
Del Galdo, G. et al "Efficient Methods for High Quality Merging of Spatial Audio Streams in Directional Audio Coding" AES Convention, May 2009.

* cited by examiner

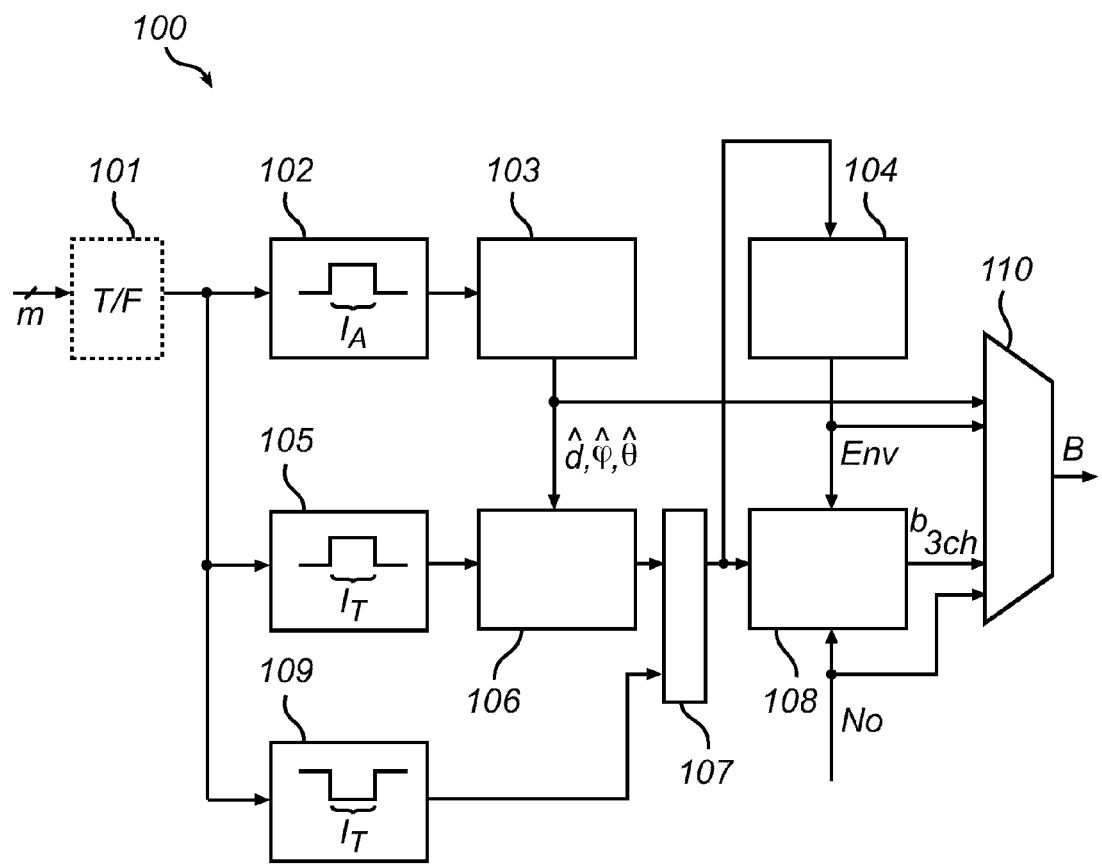
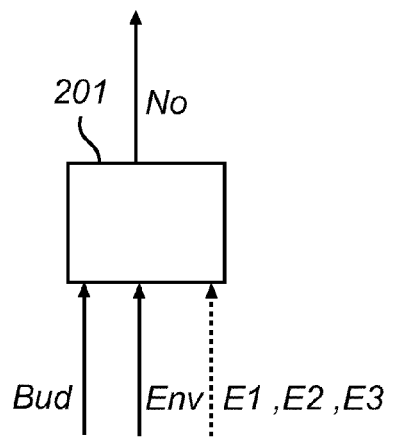 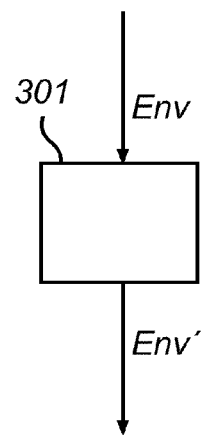
Fig. 2    Fig. 3

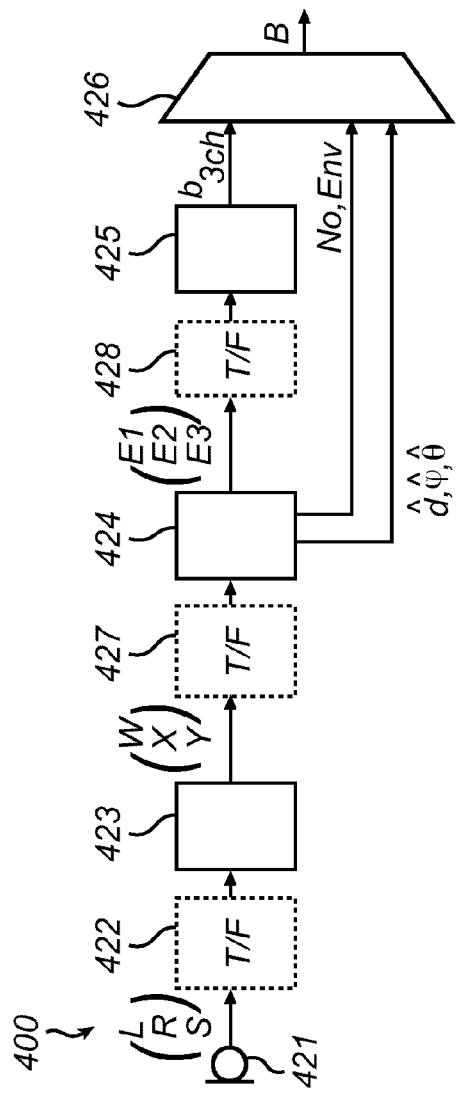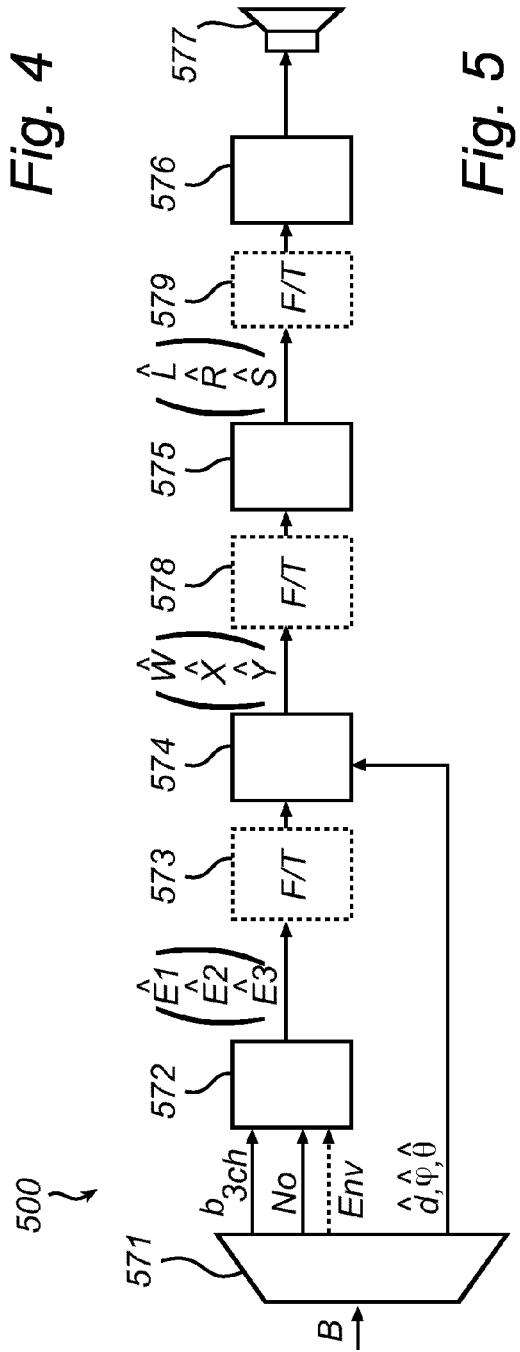
Fig. 4
Fig. 5

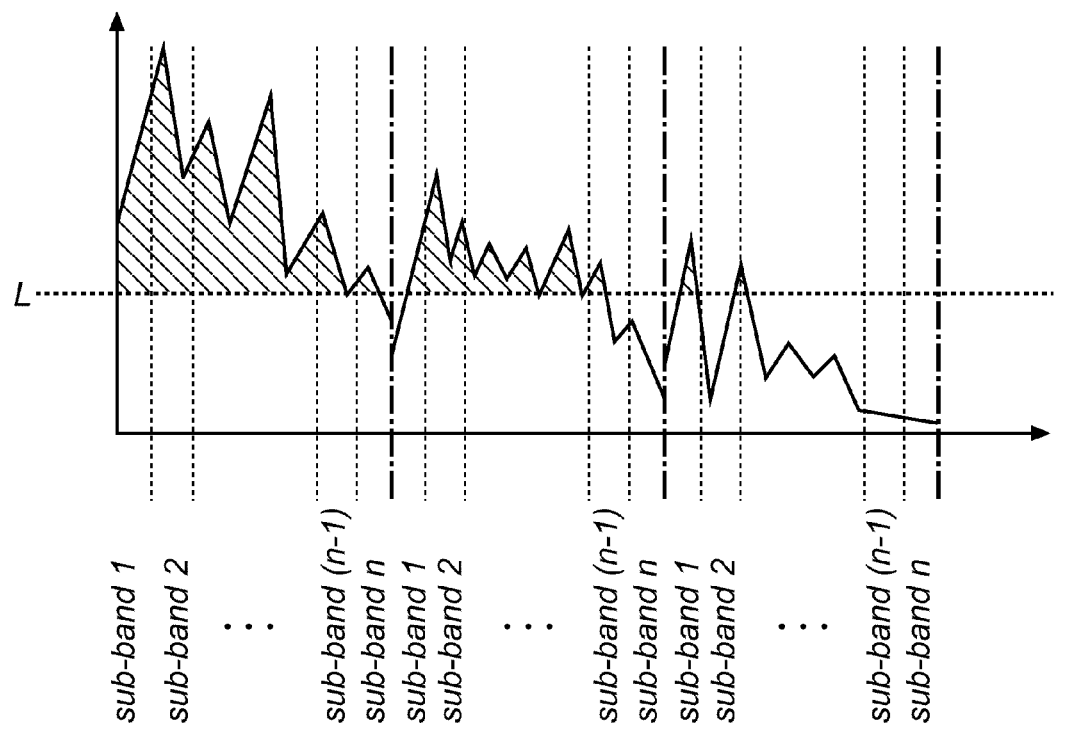
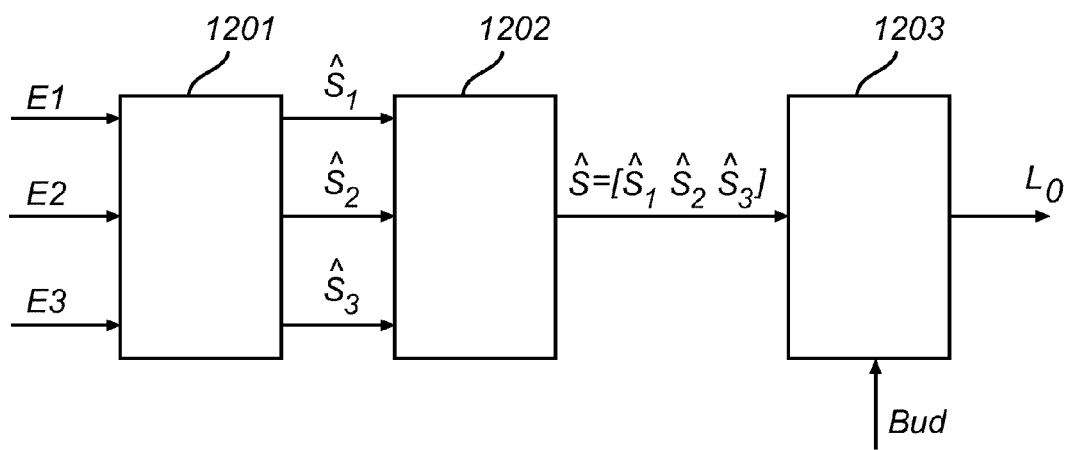
Fig. 12

CODING OF A SOUND FIELD SIGNAL

CROSS-REFERENCE TO RELATED APPLICATIONS

This application claims priority to U.S. Provisional Patent Application No. 61/703,857 filed 21 Sep. 2012, U.S. Provisional Patent Application No. 61/703,861 filed 21 Sep. 2012 and U.S. Provisional Patent Application No. 61/703,855 filed 21 Sep. 2012, each of which is hereby incorporated by reference in its entirety.

TECHNICAL FIELD

The invention disclosed herein generally relates to multichannel audio coding and more precisely to techniques for discrete multichannel audio encoding and decoding. Because the encoded signals can be mixed without introducing algorithmic delay, the invention is particularly useful for coding of audio signals in a teleconferencing or videoconferencing system.

BACKGROUND

Coding formats for which any inter-frame dependencies are absent or can be ignored at decoding and for which the coded signals can be mixed directly in the transform domain are known in the art. If a fixed transform window is used, then typically direct mixing is possible. Use of a fixed transform window also has the advantage that a mixing operation requires a reduced computational load and does not add algorithmic delay.

However, advantageous coding formats of this type are known only for single-channel mono audio signals. It would be desirable to extend their use to sound field signals, e.g., signals in a spatial sound field captured by an array of three or more microphones, artificially generated sound field signals, or signals converted into a sound field format, such as B-format, G-format, Ambisonics™ and the like. This would for instance enable a richer representation of the participants in a teleconference, including their spatial properties such as direction of arrival and room reverb. Straightforward approaches, e.g., using one encoder for each input signal to be encoded and letting these operate independently in parallel, will not be competitive as far as coding efficiency is concerned.

Hence, it would be desirable to propose a surround audio format that allows lower coding rates in a multichannel system while maintaining spatial properties and high overall audio quality.

BRIEF DESCRIPTION OF THE DRAWINGS

Embodiments of the invention will be described with reference to the accompanying drawings, on which:

FIG. 1 is a generalized block diagram of an audio encoding system according to an embodiment of the invention;

FIG. 2 shows a noise level computing section, which may be an optional component in the audio encoding system of FIG. 1;

FIG. 3 shows a rescaling section, which may be an optional component in the audio encoding system of FIG. 1;

FIG. 4 shows an audio encoding system according to an embodiment of the invention;

FIG. 5 shows an audio decoding system according to an embodiment of the invention;

FIGS. 12 and 16 illustrate rate allocation processes practised in audio encoding systems according to embodiments of the invention, wherein the process in FIG. 12 allocates the coding bit budget on the basis of a flat noise profile, while the process in FIG. 16 allocates the coding bit budget after a perceptually justified rescaling of the noise profile (on a subband basis) to be comparable with the spectrum;

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION

I. Overview

Figure 6:
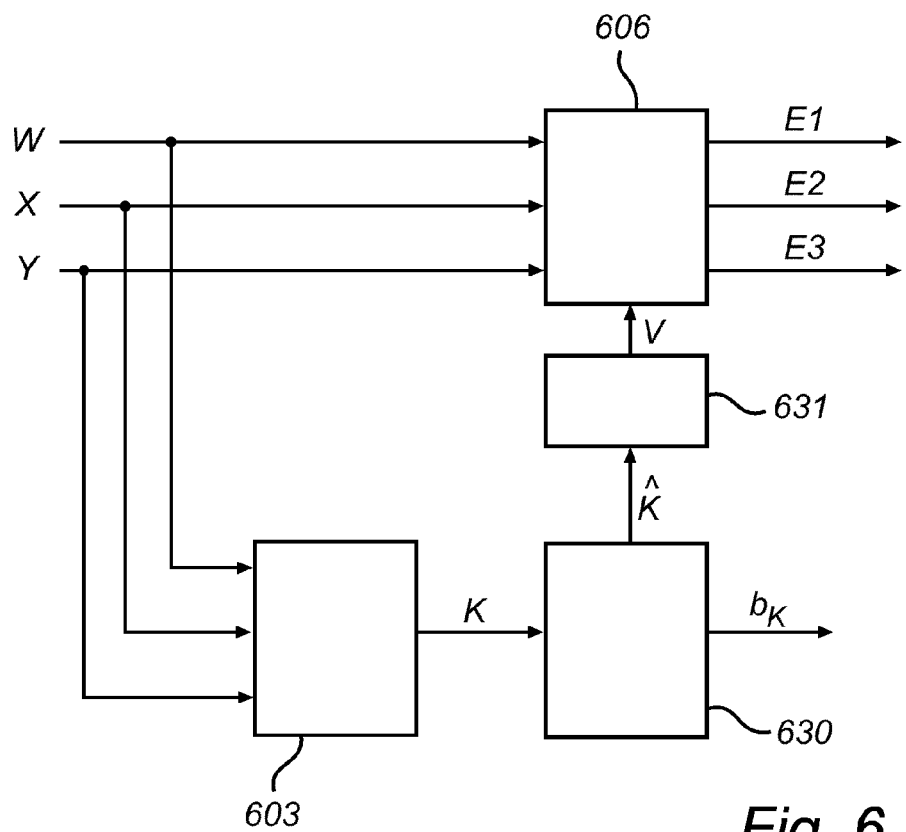
FIG. 6 shows a detail of an audio encoding system, more precisely a spatial analyzer supplying quantized decomposition parameters to an adaptive rotation stage.

As used herein, an "audio signal" may be a pure audio signal or an audio part of an audiovisual signal or multimedia signal.

In example embodiments, the present invention proposes methods and devices enabling distribution of audiovisual media in a rate efficient manner, which can be used to economize bandwidth and/or storage space. These example embodiments have the benefit of producing signals susceptible of computationally lean mixing (and additive mixing in particular) that introduces a limited amount of algorithmic delay, if any. Example embodiments of the invention are typically able to encode a set of N surround audio signals as a smaller set of data than N times the data required to encode one of the signals in the set.

An example embodiment provides an audio encoding system comprising a spatial analyzer, an adaptive orthogonal transform stage, a spectral envelope analyzer and a multichannel encoder. The encoding system receives a plurality of audio signals W, X, Y and outputs information sufficient to restore the signals, such as transform coefficients, decomposition parameters and optionally a spectral envelope and/or a noise offset No. The spatial analyzer determines, based on the values of the audio signals W, X, Y, decomposition parameters $d$, $\phi$, $\theta$. In implementations where the audio signals are segmented into time frames (or time blocks of a different type), the decomposition parameters are preferably determined once for each time frame. Optionally, the decomposition parameters are output in quantized form; this way, the encoder and decoder side will use identical values as far as the decomposition is concerned, and the effect of rounding errors will be reduced.

The decomposition parameters $d$, $\phi$, $\theta$ from the spatial analyzer are used to control an adaptive rotation stage, in which they determine the quantitative properties of an orthogonal transformation. The orthogonal transformation may be a linear transformation, such as a multiplication by a matrix having one or more entries that may vary in response to the values of the audio signals W, X, Y. This adaptability may confer energy-compacting characteristics to the orthogonal transformation, in the following sense: in the rotated audio signals E1, E2, E3, which are the output of the orthogonal transformation, the total energy may be more or less localized to the first rotated audio signal (possibly after renumbering) or the first two rotated audio signals, while the remaining signal(s) may contain significantly less energy. A further possible effect of the orthogonal transformation effectuated by the adaptive rotation stage is that the rotated audio signals E1, E2, E3 are mutually decorrelated.

The spectral envelope analyzer receives as input a frequency-domain representation, in terms of transform coefficients inter alia, of the rotated signals. The rotated audio signals may have been output as a frequency-domain representation from the adaptive rotation stage, which may be the case if a time-to-frequency transform stage is located further upstream in the processing path. Alternatively, the rotated audio signals may have been output as a time-domain representation from the adaptive rotation stage, in which case a time-to-frequency transform stage may be arranged between the adaptive rotation stage and the spectral envelope analyzer. The spectral envelope analyzer outputs a spectral envelope. The spectral envelope may comprise energy or power values for a plurality of frequency subbands of equal or variable length. For instance, the spectral envelope may comprise individual spectral envelopes corresponding to respective rotated audio signals; it may also be provided as a super-spectrum comprising juxtaposed individual spectral envelopes, which may facilitate subsequent processing.

The multichannel encoder outputs transform coefficients (possibly after suitable format adjustments including quantization), which are extracted from the frequency-domain representations of the rotated audio signals in specific subband collections thereof. Even though the subband collections for different rotated audio signals are determined in a joint allocation process, as will be discussed below, the subbands that the process includes in a subband collection for one rotated audio signal has no direct influence on the subband collections associated with the other rotated audio signals; by virtue of this mutual independence, the subband collections may assume different values. If some transform coefficients belong to subbands outside the subband collections, they will not be part of the output of the audio encoding system; preferably, these subbands will be restored on the decoding side by synthesis (e.g., noise injection).

The rate allocation process in the multichannel encoder is based on a joint comparison of a noise profile (No), which is defined for all rotated audio signals and may have different values for each, and the spectral envelopes of all rotated audio signals. A subband in a rotated audio signal is included in the subband collection of that signal if the associated spectral envelope value in that subband is greater than the noise profile. This is to say, rate is allocated (e.g., coding bits are allocated) to the transform coefficients in the concerned subband. Hence, available rate is distributed to all rotated audio signals using a uniform criterion. The uniform criterion may be the outcome of said envelope-to-noise-profile comparison in the concerned subband. The output of the adaptive encoding system, including the transform coefficients in the subband collections, the decomposition parameters and the noise profile data, may be multiplexed into a bitstream in a format suitable for transmission or storage.

An advantageous way to perform the rate allocation process is to define a parameter governing a quantitative property of the noise profile in such manner that the cost (or rate expense) is susceptible to change in response to a change of the value of the parameter. The parameter is then varied, possibly by successive iterations, until a noise profile is obtained that gives a cost that approximates an available coding budget (from below) most closely. For instance, the cost may be computed in detail for each new value of the parameter. This may be implemented by a feedback approach, according to which a tentative noise profile may be adjusted using the parameter in response to the cost it gives rise to, up to a point where the rate expense is approximately equal to the coding bit budget. The varying of the parameter may be considered as—and solved as—an optimization problem, namely of minimizing (or at least reducing) the parameter subject to the coding bit budget constraint. There is typically an inverse relationship between the integral of the noise profile and the available coding bit budget. The coding afforded by the encoding system may be seen as a best-effort approach in the sense that the noise profile will be placed at the lowest possible level (by downscaling, downshifting or the like) at which there is still a sufficient amount of available rate to transmit all subbands that pass the criterion. In particular, the parameter may be an offset (additive offset) or a magnitude factor (multiplicative factor).

This example embodiment represents an advantage of the straightforward approach outlined in the Background section, in which a single-channel coding technique is simply duplicated and applied separately for each audio signal. To solve the rate allocation problem in such an approach, it would have been necessary to make assumptions on a "fair" rate distribution between the signals (inter-signal rate distribution) before proceeding to the task of distributing available rate between the subbands of each signal (intrasignal rate distribution). A theoretical result that could guide such assumptions in the prior art is found in A. Gersho and R. M. Gray, *Vector Quantization and Signal Compression*, Kluwer (1991): The optimal bit assignment to the $i^{th}$ random variable in a collection of identically distributed normalized random variables is, under the high rate approximations, $b_i = B/k + \log_2(\sigma_i/\rho)$, where $\sigma_i^2$ is the variance of the $i^{th}$ random variable and $\rho = (\Pi_{i=1}^k \sigma_i^2)^{1/2k}$. Applied to multichannel audio coding, the random variable would correspond to the channels, and the variances to the channel energies. Unlike this approach, the present example embodiment solves the rate allocation problem jointly for all subbands of the rotated audio signals, which provides for an optimal use of the available rate in a given situation. In general, the present example embodiment will not distribute the available rate in the same fashion as if the above theoretical result had been followed. Because an orthogonal transformation is applied, the energy scale of the rotated audio signals will stay comparable, so that rate distribution decisions based on a uniform criterion will result in a fair inter-signal distribution of the available rate.

In a further example embodiment, there is provided an adaptive audio encoding method analogous to the operation of the encoding system described in the preceding paragraphs.

In one example embodiment, the noise profile is based on a sum of a noise shape, which is fixed for a given frame, and a noise offset No common to all rotated audio signals. The audio encoding system further comprises a noise level computing section, which determines the noise shape based on the spectral envelope. For instance, because empirical evidence suggests that the human ear is more sensitive to noise in spectral valleys, the noise shape may be relatively higher in a subband where the associated rotated audio signal has high energy, and vice versa. Hence, irrespective of the noise offset, the rate allocation process will tend to be relatively more generous towards frequency subbands with less energy. As a consequence, the noise shape may vary between subbands in this example embodiment. Furthermore, the noise shape may vary between two corresponding subbands in different rotated audio signals. The relationship between an increase in energy in a subband of the spectral envelope and the increase it gives rise to in the noise shape generated therefrom is subject to tuning, possibly including listening tests. This is a standard procedure in the field and lies within the abilities of the average practitioner. The noise offset No may be determined subsequently by way of an iterative process, in which the coding cost is computed for a number of candidate noise offset values.

In an example embodiment, the noise profile is constant with respect to frequency. For instance, the noise shape may be identically zero, so that the noise profile is completely determined by the noise offset No. The noise profile may be updated in response to variations of the spectral envelope Env and, possibly, in response to coding bit budget updates, e.g., to reflect bandwidth fluctuations over time. As discussed above, the values of the transform coefficients for the actual frame may optionally be taken into account. In either case, the fairness of the rate allocation process may be improved by rescaling the spectral envelope, so that its scale is perceptually comparable to the noiseprofile. In particular, the rescaling may reduce peaks and/or increase valleys, in a manner to reflect the sensitivity of the human ear to noise. In particular, the rescaling may be exponential, e.g., a downscaling of all spectral envelope values in logarithmic units by a constant factor less than unity, such as ½. The effect of the rescaling is that the application of the uniform criterion will give relatively higher priority to relatively quieter subbands over relatively louder subbands. It is noted that the spectrum rescaling is made for the purpose of the rate allocation only; the multichannel encoder is configured to output the transform coefficients on their original scale, and if the encoding system outputs the spectral envelope (e.g., as part of an output bitstream), it will retain its original scale as well. Alternatively, it is possible to rescale the spectral envelope based on the spectral envelope itself, so that the latter is flattened (or even rescaled into a constant function of frequency) whereas the noise profile is variable with respect to frequency.

In an example embodiment, the spatial analyzer uses a restricted frequency subrange (analysis frequency subrange) of the audio signals in order to determine the decomposition parameters. For instance, if the encoding system is configured to transmit speech, it may use the signal values in the normal frequency subrange of speech as input for the computation of the decomposition parameters. The complement of this subrange, which typically contains less relevant acoustic information, may be ignored for the purposes of determining the decomposition parameters but may nevertheless be supplied to the adaptive rotation stage and the multichannel encoder, so as to form part of the encoded signal.

Additionally or alternatively, the adaptive rotation stage acts only on a restricted frequency subrange (decomposition frequency subrange) of the audio signals. The decomposition frequency subrange may coincide with the analysis frequency subrange; alternatively, it may be distinct from the analysis frequency subrange. Hence, the adaptive rotation stage outputs an incomplete representation of the rotated audio signals, which includes the decomposition frequency subrange only, but no information in the complement of the decomposition frequency subrange. A combining section is operable to combine this incomplete representation with that portion of the audio signals (before the orthogonal transformation) which corresponds to the complement of the decomposition frequency subrange. Hence, the combining section will output rotated audio signals, which contain output from the adaptive rotation stage in the decomposition frequency subrange and which contain data equivalent to the input to the adaptive rotation stage in the complement of the decomposition frequency subrange. In this example embodiment, the encoding system preferably receives a frequency-domain representation of the audio signals or includes a time-to-frequency transform stage arranged upstream of the spatial analyzer. This enables direct concatenation of the data relating to different frequency subranges.

In an example embodiment, the spatial analyzer is configured to determine the decomposition parameters independently for two or more distinct decomposition frequency subranges for the same time frame. Based on the two or more sets of parameter values thus obtained, the adaptive rotation stage is configured to apply the orthogonal transformation independently to each of these decomposition subranges with corresponding values of the decomposition parameters. A combining section concatenates the results (frequency-domain representations) of the different runs of the orthogonal transformation, possibly with data from a subrange which has not undergone orthogonal transformation at all. This embodiment allows the quantitative properties of orthogonal to be adapted more accurately to the actual signal data.

In an example embodiment, the encoding system includes a time-invariant pre-conditioning stage, which receives a plurality of input audio signals L, R, S and outputs said plurality of audio signals W, X, Y. In particular, the input signals may have been obtained by means of three angularly distributed transducers or may result from a simulation configured to produce signals mimicking the behaviour of this arrangement of transducers. Angularly distributed transducers may be directive transducers arranged at 120 degree intervals in a plane. (The condition of 120-degree spacing is not essential, because signals captured with transducers having a different spatial arrangement can be readily transformed as long as they are sufficiently independent that they span the sound field.) In particular, the directive transducers may have a cardioid or cardioid-like spatial sensitivity pattern (or pick-up pattern) in said plane. The pre-conditioning stage may form a linear combination of the input signals in accordance with a matrix P(h) which is constant over time, as per $[W\ X\ Y]^T = P(h)\ [L\ R\ S]^T$. The matrix may in particular be given by $$P(h) = \frac{1}{3}\begin{bmatrix} 2h & 2h & 2h \\ 2 & 2 & -4 \\ 2\sqrt{3} & -2\sqrt{3} & 0 \end{bmatrix},$$

where h>0 is a finite constant. h has the function of a tuning parameter, which may be used to adapt the pre-conditioning to specific perceptual requirements. As a general guideline, it may be noted that a decrease in h increases the spatial directivity of the encoding system, so that the limit h→∞ will correspond to a complete loss of directivity. This is because the first audio signal W, which is a non-weighted average of the three input signals, will dominate for large values of h over the two other audio signals X, Y.

In an example embodiment, the spatial analyzer is configured to perform an eigen-analysis of the audio signals (or the data of these signals in the decomposition frequency subrange). In some example embodiments, it may not be necessary to perform a full eigen-analysis; instead, it may be sufficient to compute eigenvectors numerically by any suitable method in numerical linear algebra, such as power iteration, an implementation of QR decomposition or the like.

If eigen-analysis is performed, it may include computing covariances between each pair of audio signals (wherein the covariance of a signal with respect to itself may referred to as the variance of the signal). Diagonalization of a symmetric matrix with the covariances as its entries will lead to a decomposition of the audio signals, wherein the eigenvalues correspond to signal energies. The rotated signals correspond to projections on columns of the eigenvector matrix resulting from the diagonalization, which may be reordered according to decreasing eigenvalue magnitude, so that an energy compaction is achieved. This processing step may further achieve a decorrelation of the audio signals. The eigen-analysis may for example be an implementation of the Karhunen-Loéve transform. In a further development of this, the spatial analyzer is configured to perform smoothing of frame-wise covariance values (e.g., ordered in frame-wise matrices) before it proceeds to the eigen-analysis (e.g., diagonalization of the matrix for the current frame). In particular, the smoothing may take place by a finite impulse response filter which adds a contribution from the previous frame or frames to the covariance values in order to obtain a smoothed current frame. Alternatively, an infinite impulse response filter (or recursive filter) is used for the same purpose. Further alternatively, median filtering may be applied to smoothen the successive covariance values. Smoothing may be beneficial because the spatial properties typically vary on a slow time scale compared to the frame rate. The frame rate typically has been set by considering known properties of speech and with the purpose of minimizing latency. Without smoothing, a covariance matrix for a given frame may not capture the underlying spatial properties but instead the random fluctuations in the signals. Hence, smoothing reduces the risk of instabilities in the coded output. Suitably tuned smoothing may in fact ensure that the dominant rotated audio signal (the one associated with the asymptotically largest signal energy, typically E1) is sufficiently stable that it may be used as a monophonic representation of the audio signals. Because rapid variations are avoided to a large extent, the dominant rotated audio signal will perceptually acceptable as a monophonic representation while still being part of an energy-compacted (e.g., entropy-rotated, decorrelated) representation of a sound field. Hence, the dominant rotated audio signal may serve a double purpose. This insight may form the basis of a bandwidth-economical, layered coding format that may be played either as a monophonic output or an audio field output depending on the playback equipment at the receiving end.

In an example embodiment, the eigenvector matrix is parameterized as follows:

$$V(d, \varphi, \theta) = \\ \left[\begin{bmatrix} c(1-d) & 0 & cd \\ cd\cos\varphi & -\sin\varphi & -c(1-d)\cos\varphi \\ cd\sin\varphi & \cos\varphi & -c(1-d)\sin\varphi \end{bmatrix}\begin{bmatrix} 1 & 0 & 0 \\ 0 & \cos\theta & -\sin\theta \\ 0 & \sin\theta & \cos\theta \end{bmatrix}\right]^T,$$

wherein $c = 1/\sqrt{(1-d)^2 + d^2}$. One has:

$$\begin{bmatrix} E1 \\ E2 \\ E3 \end{bmatrix} = V(d, \varphi, \theta)\begin{bmatrix} w \\ X \\ Y \end{bmatrix}$$

It has been found that this parameterization of the orthogonal transform matrix is susceptible of efficient coding. In listening tests where these parameters d, φ, θ were quantized and encoded adaptively, it was noted that the coding rate requirement (which is related to the variance) of each decomposition parameter is stable over time and for different types of audio signals. This simplifies the design of quantizers for the parameters. In one example embodiment, quantized values of the decomposition parameters $\hat{d}, \hat{\varphi}, \hat{\theta}$ are encoded using the highest bit rate for $\hat{\varphi}$, the second greatest bit rate for $\hat{d}$ and the relatively lowest bit rate for $\hat{\theta}$. For instance, the ratio of the respective bit rates may be 7:5:3 in the order enumerated. The skilled person designing such quantizers may refer to published psychoacoustical studies, in which for instance the resolution of the human hearing with regard to a direction of arrival (corresponding to φ) has been measured. It is straightforward to derive a coding rate that will not yield any audible quantization error.

Another advantage of the above parameterization is that each of the parameters d, φ, θ has a close correspondence with a definite spatial property of a sound field. Further, unlike for instance such parameterizations of orthogonal matrices that include three angles, there is a high degree of independence between the parameters; hence, any error propagation between the parameters can be predicted (and possibly corrected) and is generally speaking small or absent. As such, because d is related to the degree of directivity, it is easy to determine a suitable coding rate for this parameter by using directivity-oriented listening tests; because ϕ is related to the direction of the strongest component of the sound field, its suitable coding rate may be determined by experiments evaluating a subject's ability to identify this direction, etc.

Moreover, as will be described below, the above parameterization can be more efficiently quantized after a pre-processing step is carried out, during which the parameter values are mapped into more restricted intervals without loss of generality. From such considerations, as described below, it follows that $d \in [0,1]$, $\phi \in [-\pi, \pi]$ and either $\theta \in [-\pi, \pi]$, $\theta \in [-\pi/2, \pi/2]$ or $\theta \in [0, \pi/2]$ depending on the mappings used. In an example embodiment, the spectral envelope is determined by forming weighted averages of the transform coefficients of the rotated audio signals. Each average will represent the spectral envelope in one subband. The subbands may have equal length. Alternatively, the subbands may be wider for higher frequencies.

In an example embodiment, the spectral envelopes of all rotated signals are encoded jointly. For instance, the three or more spectral envelopes may be concatenated into a super-envelope. The joint encoding has at least two advantages. First, the super-envelope is adapted for treatment in the multichannel encoder, which applies a uniform rate allocation criterion to all subbands of all rotated audio signals. Second, because the spectral envelopes of the three rotated audio signals will be statistically correlated to some extent, it may be rate-economical to encode the super-envelope by an entropy-type coding scheme, which reduces the redundancy.

In an example embodiment, the transform coefficients are encoded in terms of their differences to a frequency derivative of the spectral envelope. This may lead to more rate-efficient coding because these differences are typically smaller numbers, which will, on a linear quantization scale, enable more accurate coding at a given coding bit budget. It is noted that the differences may be positive or negative numbers. More precisely, the noise offset may be determined by guessing an initial noise offset value; normalizing the transform coefficients of the rotated signals by deducting the frequency derivative of the spectral envelope; selecting a quantizer for each frequency subband; finding the coding cost by encoding those frequency subbands for which the spectral envelope exceeds the noise profile, whereupon the quantizer selected for that subband is activated. Because the transform coefficients of the rotated signals are pre-processed by deducting the spectral envelope derivative, the data can be efficiently encoded for a relatively smaller set of available quantizers than if pre-processing had not been applied. In the case where pre-processing is not applied, efficient coding will either require the quantizers to be adaptive (e.g., as to their step size) or, simply, the set of available coders to be larger.

In a second aspect of the invention, an example embodiment provides an adaptive audio decoding system. In the decoding system, a multichannel decoder receives transform coefficients of a plurality of rotated audio signals. The multichannel decoder restores the rotated audio signals based on the transform coefficients and outputs these as three or more rotated audio signals $\hat{E}1$, $\hat{E}2$, $\hat{E}3$. An adaptive rotation inversion stage in the decoding system receives decomposition parameters, which may correspond to pre-defined quantization levels, from which it derives coefficients for use in a linear combination of the restored rotated audio signals. The output of the adaptive rotation inversion stage is de-rotated audio signals $\hat{W}$, $\hat{X}$, $\hat{Y}$. The coefficients in the linear combination may be proportional to the elements in an inverse of the matrix V defined above. The transform coefficients and the decomposition parameters may be received as parts of a bitstream; the bitstream may be prepared by an adaptive audio encoding system in accordance with the first aspect. The transform coefficients and the decomposition parameters may be derived from the bitstream by way of a demultiplexing operation.

Within the second aspect, a further example embodiment provides an audio decoding method comprising method steps corresponding to the operation of the decoding system described in the preceding paragraph. As an advantage common to these both example embodiments, the decoding system and the decoding method form part of an efficient coding ecosystem, by which audio data can be stored or transmitted at low storage or bandwidth cost. In particular, a communication and data processing device which includes the decoding system or which performs the decoding method may provide a satisfactory output audio quality already at a modest incoming communication bandwidth.

In an example embodiment, the multichannel decoder in the decoding system is configured to synthesize those parts of the restored audio signals which relate to frequency subbands for which no transform coefficients are transmitted. The synthesis may in particular include noise injection. The synthesis may be guided by a spectral envelope of the rotated audio signals, which spectral envelope is received by the decoding system. Alternatively, the synthesis may be guided by a noise profile derived from a received noise offset value and a noise shape, which the decoding system computes on the basis of the spectral envelope.

In an example embodiment, the adaptive rotation inversion stage is configured to form said linear combination only on the basis of a decomposition frequency subrange $I_T$ of the restored rotated signals. The remainder of the full frequency spectrum may be left unchanged. The principle is similar to that of the adaptive rotation stage in the encoding system described above. Supplementary or alternative to this, the adaptive rotation inversion stage may be configured to carry out several inversions (corresponding to the formation of several linear combinations of the restored rotated signals) in different frequency subranges.

In an example embodiment, the decoding system comprises a post-processing stage. The post-processing stage may be configured to carry out the inverse operation of the pre-processing stage described above in connection with the adaptive encoding system. In particular, it may be configured to form a linear combination in accordance with an inverse of the h-dependent matrix P(h) disclosed above. For this purpose, the decoding system may be configured to accept a value of the parameter h.

In an example embodiment, there is provided a computer program product comprising a computer-readable medium with instructions for causing a computer to execute the adaptive encoding method or the adaptive decoding method in any of the example embodiments described above or in the claims. In a further example embodiment, there is provided a data structure including transform coefficients relating to a subband collection for each of at least three rotated audio signals, which have been transformed by an energy-compacting orthogonal transform, and decomposition parameters allowing restored versions of said rotated audio signals to be de-rotated. Optionally, the data structure may further include the spectral envelope Env and/or the noise offset No.

In a third aspect of the invention, example embodiments provide audio processing methods which derive benefits from to the parameterization of the eigenvector matrix V(d, φ, θ) which was introduced above. It turns out that the parameterization contributes to the coding efficiency and controllability of storage and communication methods. Further, it allows for efficient signal processing with the purpose of evaluating technically relevant observables relating to a sound field.

In an example embodiment, an audio processing method includes capturing a sound field by means of three angularly distributed directive transducers, whereby three audio signals are obtained. The directive transducers are angularly distributed by being non-parallel, so that they span at least two dimensions of the sound field. The transducers may be real or virtual. Examples of real transducers include acoustic microphones. Alternatively, characteristics of a computer-assisted simulation, by which the audio signals are obtained by performing such operations as mixing, spectrum shaping, phase modification and the like on a set of input audio signals, may be seen as a recording of the audio signals my means of virtual transducers in accordance with the properties of the simulation.

In subsequent step, an energy-compacting orthogonal transformation is applied to said three audio signals. This produces three rotated audio signals. The quantitative properties of the orthogonal transformation are communicated in the form of the decomposition parameters introduced above. The decomposition parameters may either output together with the rotated audio signals for digital storage or digital transmission in quantized form. Alternatively, the decomposition parameters are used as a basis for deriving an observable describing the sound field, which forms an output from the audio processing method.

The advantages of the audio processing method that uses this parameterization are outlined in several different passages of the present disclosure and are summarized below:

The decomposition parameters have a stable coding rate requirement, which simplifies quantizer design and reduces the need for adaptive quantization.

Insignificant propagation of coding errors between the decomposition parameters.

The parameterization of V is well adapted to a sound field, notably for reasons of its variable directivity (parameter d), which allows for particularly efficient coding also when combined with uniform quantization and similar computationally lean approaches.

The rotation may be adaptive and based on estimated covariances of the audio signals, on which an eigen-analysis is performed. Preferably, the eigen-analysis may be preceded by a temporal smoothing of consecutive (time-segment-wise, e.g., frame-wise) values of the estimated covariances. The smoothing may in turn be signal-adaptive. In this connection, it has turned out that the first decomposition parameter d, which is directivity-related, provides a key to the suitable degree of smoothing to be applied. For coding purposes (e.g., transmission or storage), the inventors have realized that coding errors are likely to arise when the sound field is highly directive, e.g., produced by a single audio source; this property manifests itself by a relatively high value (close to 1) of the first decomposition parameter d. In a situation like this, it is beneficial to increase the amount of smoothing. Conversely, as d approaches 0, wherein the strongest eigensignal is capturing the sound field using an omni-directional sensitivity pattern, the amount of smoothing can be decreased. At low bit rate, only a small number of quantization levels are available, and fluctuations in the coded output may be noticeable. To reduce the impact of such fluctuations, a higher degree of smoothing should be applied. Further, for sound field analysis purposes, the inventors have realized that observables obtained by an eigen-analysis on estimated covariances (such observables include direction of arrival, directivity etc.) can be obtained more reliably, with less fluctuations, by applying temporal smoothing to the underlying covariances than by applying temporal smoothing to the observable itself.

The adjustable degree of directivity offered by the parameterization can conversely be controlled by placing a condition on the first decomposition parameter, e.g., restricting it to a proper subinterval of the full range [0, 1]. This may be advantageous where the full set of orthogonal transformations would include harmful ones, e.g., which capture sound fields having a too high or too low degree of directivity. By the present parameterization it is possible to constructively exclude such transformations by placing a condition on the first decomposition parameter d.

Another advantage related to coding efficiency is that one of the two decomposition parameters which are angles can be mapped without loss of generality (all orthogonal transformations are still spanned) to a smaller interval by reordering and/or sign flipping.

Example embodiments further provide audio processing systems with functional components configured to perform one of the audio processing methods according to the third aspect of the invention described above.

Features explained within the various example embodiments of the first aspect of the invention can be combined advantageously with embodiments under the third aspect. For instance, inclusion of a pre-processing step similar to the one described above may be beneficial in applications of the audio processing method in the third aspect.

It is noted that the invention relates to all combinations of features, even if these are recited in mutually different claims.

II. Example Embodiments

FIG. 1 shows an adaptive encoding system 100 in accordance with an example embodiment. It includes a time-to-frequency transform 101, which receives a time-domain representation of n audio signals and outputs a frequency-domain representation of these. For instance, the time-to-frequency transform 101 may be a modified discrete cosine transform based (MDCT based) transform coder with 20 ms stride operating at 32 kHz sampling rate (i.e., having a transform size of 640 bins). It may convey a spectral envelope of each audio signal in terms of subband-wise energies. The coding concept may have one or more of the following properties: scalar quantization of the MDCT-lines in combination with Huffman block coding; transmission of information relating to noise addition (noise fill) to be effected on the decoder side; high frequency reconstruction (HFR) technique, for example, based on a copy-up approach. In the present example, the encoding system 100 is configured to process three-channel audio, that is, the coding is concerned with a representation of a sound field in terms of three audio signals. As those skilled in the art will realize, however, this example embodiment can be readily generalized into a four-channel, five-channel or higher number encoding system.

The frequency-domain representation produced by the time-to-frequency transform 101 is supplied to a spatial analyzer 103 and an adaptive rotation stage 106. The functionalities of these two components have been described above. Optionally, as shown on the drawing, the spatial analyzer 103 and/or the adaptive rotation stage 106 may be optionally preceded by frequency-discriminating components 102, 105, 109 ensuring that the respective inputs to the former two components are restricted to an analysis frequency subrange $I_A$ and a decomposition frequency subrange $I_T$ of said plurality of audio signals. As already mentioned, the spatial analyzer 103 and the adaptive rotation stage 106 may be configured to process a plurality of frequency subranges independently. It is noted that the rotated audio signals are obtained as the output of a combining section 107, which receives the decomposition frequency subrange $I_T$ (or decomposition frequency subranges $I_{T1}$, $I_{T2}$, $I_{T3}$, ...) from the adaptive rotation stage 106 and which receives the complement of the decomposition frequency subrange $I_T$ directly from the third frequency-discriminating component 109 without any further signal processing. The adaptive rotation stage 106 is controllable by decomposition parameters $\hat{d}$, $\hat{\varphi}$, $\hat{\theta}$, which it receives from the spatial analyzer 103, and performs the following linear transformation:

$$\begin{bmatrix} E1 \\ E2 \\ E3 \end{bmatrix} = V(\hat{d}, \hat{\varphi}, \hat{\theta}) \begin{bmatrix} W \\ X \\ Y \end{bmatrix}.$$

with the eigenvector matrix $V(\hat{d}, \hat{\varphi}, \hat{\theta})$ described above. The rotated audio signals E1, E2, E3 are supplied to a spectral envelope analyzer 104 and a multichannel encoder 108, which further receives a noise offset No and a spectral envelope Env provided by the spectral envelope analyzer 104. The multichannel encoder 108 executes a rate allocation process of the type described above and outputs an encoded multichannel bitstream $b_{3ch}$ carrying transform coefficients of the three rotated audio signals E1, E2, E3 only for subbands in the subband collections resulting from the rate allocation process. The remaining transform coefficients need not be output from the multichannel encoder 108. The encoded multichannel bitstream $b_{3ch}$ further includes the spectral envelope Env and the noise offset No.

Figure 17:
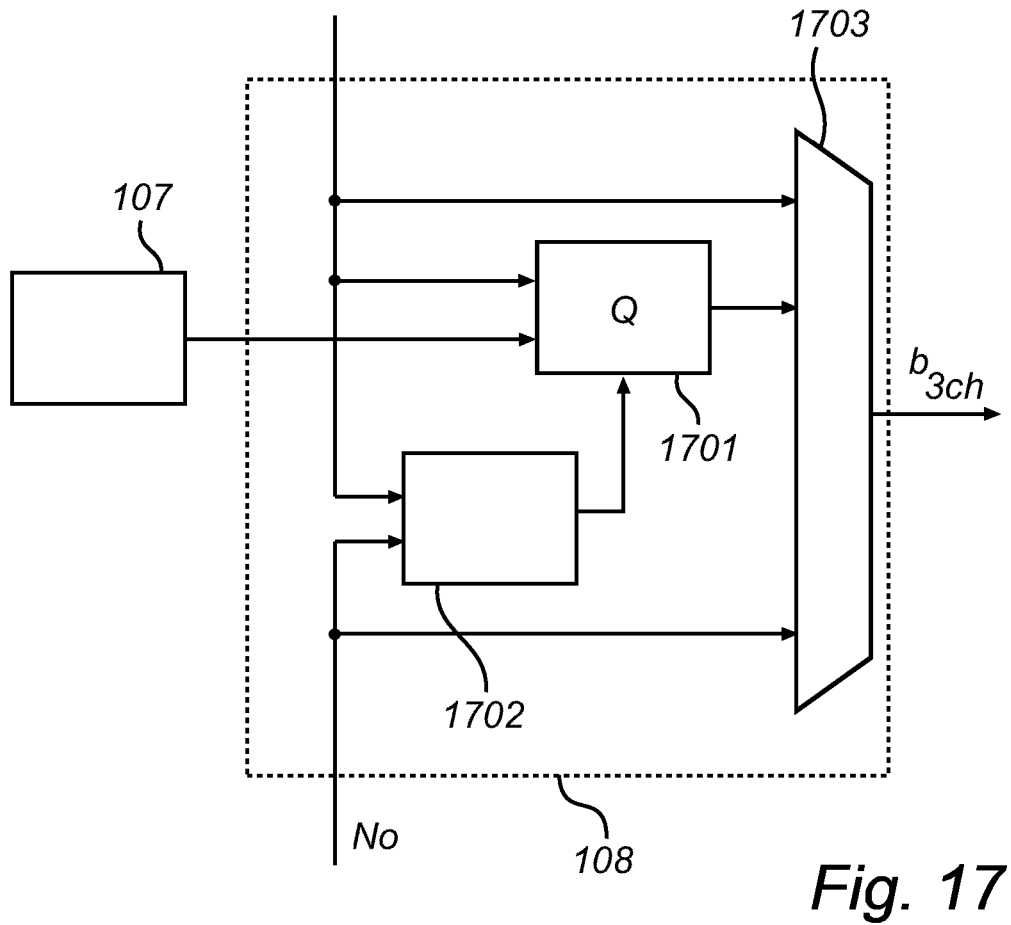
FIG. 17 shows a detail of an audio encoding system, more precisely a multichannel encoder, which is configured to allocate available coding bitrate by comparison between a noise profile and an envelope of a plurality of signals.

FIG. 17 shows the multichannel encoder 108 in greater detail. It receives as input the transform coefficients of the rotated audio signals E1, E2, E3 from the combining section 107, the spectral envelope Env from the spectral envelope analyzer 104 and the noise offset No. The multichannel encoder 108 comprises a quantizing section 1701, which receives the spectral envelope Env and the transform coefficients of the rotated audio signals E1, E2, E3 and outputs, based thereon, quantized transform coefficients in the subband collection resulting from the rate allocation process described above. A quantizer selector 1702 in the multichannel encoder 108 selects for each subband of each rotated audio signal, based on the noise offset No and the local value of the spectral envelope, a quantizer which if activated will map the transform coefficient in that subband to a quantization index. Each quantizer may comprise codebook associating a set of quantization levels with quantization indices. Each quantizer may have constant or scalable quantization step size. A quantizer in a given subband is activated if the spectral envelope locally exceeds the noise profile in the subband. It is noted that the quantizer selector 1702 has the necessary information for computing the noise profile, which in this embodiment is a sum of the noise offset No and a noise shape, wherein the noise shape in a given time frame can be derived from the spectral envelope Env. Further, the multichannel encoder 108 includes a multiplexer 1703 configured to gather the quantized transform coefficients, the spectral envelope Env and the noise offset No into the multichannel bitstream $b_{3ch}$.

The output bitstream B of the encoding system 100 is prepared by a multiplexer 110 on the basis of the transform coefficients in the multichannel bitstream $b_{3ch}$ of the three rotated audio signals E1, E2, E3 (for subbands in the subband collections) from the multichannel encoder 108 and on the decomposition parameters $\hat{d}$, $\hat{\varphi}$, $\hat{\theta}$ from the spatial analyzer 103. If the decomposition parameters are not supplied in quantized form, the multiplexer 110 may effect a quantization.

FIG. 4 shows an audio encoding system 400 including a transducer 421 for converting an acoustic excitation into a plurality of input signals L, R, S in digital form, which propagate in an electric conductor, optical medium or the like. The input signals L, R, S are represented in the time domain, e.g., as waveform signals provided as functions of time. The input signals L, R, S may be segmented into time blocks or time frames. A time-to-frequency transform stage is provided in one of the locations indicated by reference numbers 422, 427 and 428. There is provided a multichannel encoder 425, in relation to which all of these locations are further upstream. A frequency-domain representation of the type to be output from the time-to-frequency transform stage associates each time block or time frame of the signal with values of transform coefficients. The multichannel encoder 425 functions similarly to the multichannel encoder 108 in the audio encoding system 100 in FIG. 1; it outputs a multichannel bitstream $b_{3ch}$ with transform coefficients only in selected frequency subbands (forming part of the subband collections) of the rotated audio signals E1, E2, E3. The multichannel bitstream $b_{3ch}$ is supplied to a multiplexer 426 at the output side of the encoding system 400; the multiplexer 426 provides an output bitstream B. A combined spatial analyzer and adaptive rotation stage 424 performs both tasks of the corresponding functional sections in FIG. 1. As such, it receives audio signals W, X, Y and outputs rotated audio signals E1, E2, E3 by way of an energy-compacting orthogonal transform controlled by the quantized decomposition parameters $\hat{d}$, $\hat{\varphi}$, $\hat{\theta}$. The quantized decomposition parameters $\hat{d}$, $\hat{\varphi}$, $\hat{\theta}$ are also supplied as input to the multiplexer 426, which includes them into the output bitstream B of the system. The spectral envelope Env and the noise offset No are supplied to the multiplexer 426 as well.

The encoding system 400 differs from the encoding system 100 in FIG. 1 by the explicit presence of a pre-conditioning stage 423 configured to convert the input audio signals into an equal number of audio signals to be supplied to the combined spatial analyzer and adaptive rotation stage 424 (or possibly, to a time-to-frequency transform stage 427 located upstream of this). The pre-conditioning stage 423 forms a linear combination corresponding to the matrix $$P(h) = \frac{1}{3}\begin{bmatrix} 2h & 2h & 2h \\ 2 & 2 & -4 \\ 2\sqrt{3} & -2\sqrt{3} & 0 \end{bmatrix},$$

where h is a finite positive constant, which is in normal operation constant. In other words, the constant h is not signal-adaptive. However, it may be varied as part of tuning procedure, which is preferably to be carried out only between operating sessions. Hence, h is a non-adaptive constant, a current value of which may be transmitted as metadata in an output bitstream B from the encoding system 400. The transformation is orthogonal if $h=\sqrt{2}$.

Figure 15:
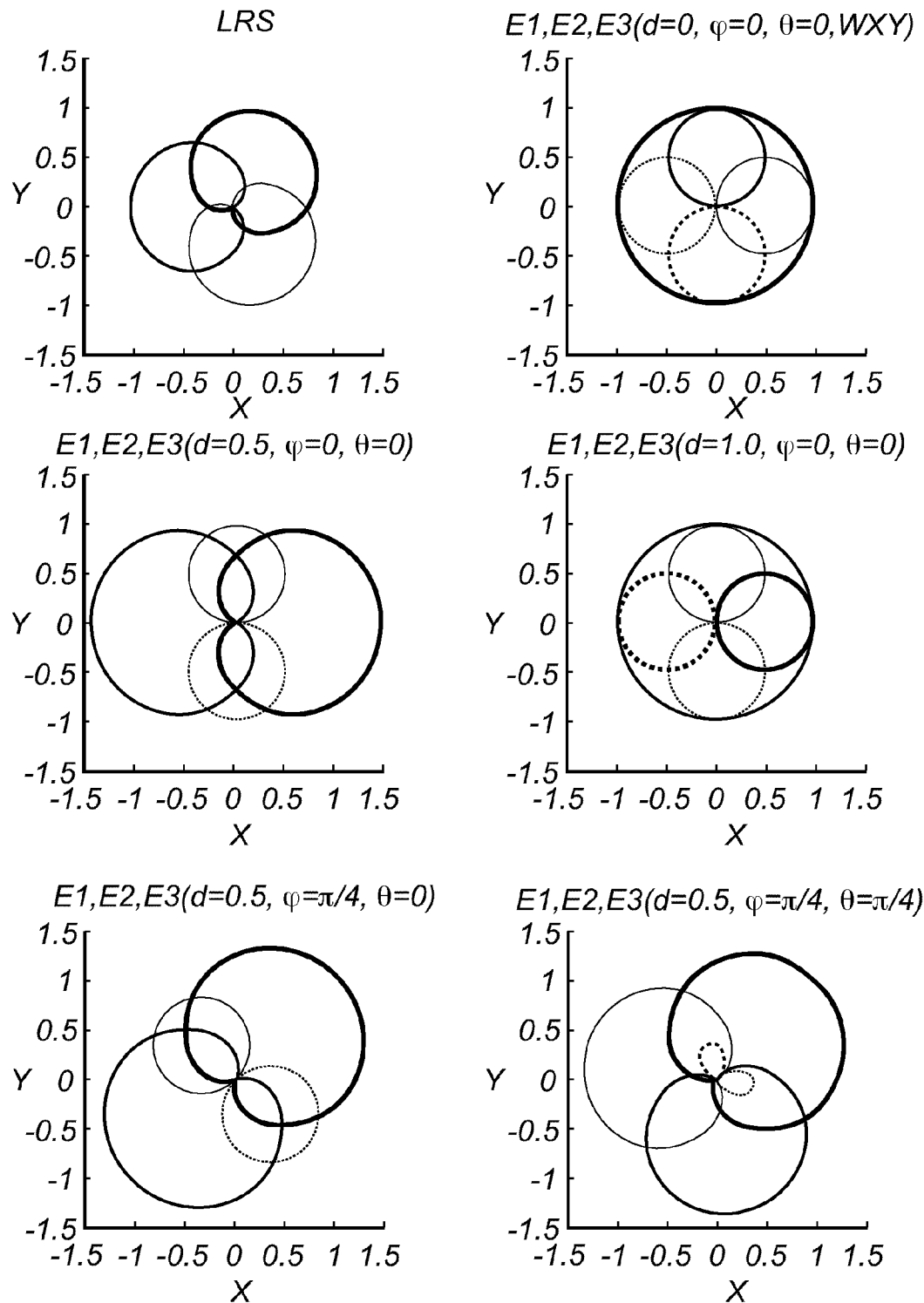
FIG. 15 illustrates the spatial sensitivity patterns of an adaptive orthogonal transformation, which may be used in connection with audio encoding and decoding systems according to embodiments of the invention, for different values of decomposition parameters (d, $\phi$, $\theta$)

FIG. 15 contains plots of the spatial sensitivity patterns arising after the composed matrix transformation $V(d, \phi, \theta) \times P(1)$ has been applied to signals recorded by three angularly distributed transducers. For example, a set of three microphones in a plane arrangement with 120 degree intervals may have a spatial sensitivity pattern similar to the example pattern in the subfigure identified by "LRS", in which sensitivity patterns from the cardioid family are shown. (Note that the forward direction is the bisector of the L and R directions, opposite to S.) In other words, the signals resulting from the composed matrix transformation will mimic the behaviour of signals recorded by transducers having the sensitivity patterns shown, for different values of the decomposition parameters $d, \phi, \theta$, in the other subfigures in FIG. 15. All subfigures are in polar form in the sense that every point on a given sensitivity curve is uniquely characterized by its azimuth angle and distance to the origin, wherein the angle corresponds to the spatial angle and the distance to the relative sensitivity. Segments of the sensitivity curves drawn in broken line correspond to negative sensitivity, that is, the signal waveform will decrease in response to an excitation in this direction by the amount indicated by the distance to the origin. The thickest line (whether solid or broken) is consistently used for drawing the curve corresponding to the first rotated signal E1. From a comparison of the sensitivity patterns for $(d, \phi, \theta)=(0, 0, 0)$ and $(d, \phi, \theta)=(1, 0, 0)$, it may be noted that the first decomposition parameter d corresponds to the degree of directivity of the first rotated signal E1: the sensitivity pattern changes from being omnidirectional into a figure-of-eight pattern.

Figure 8:
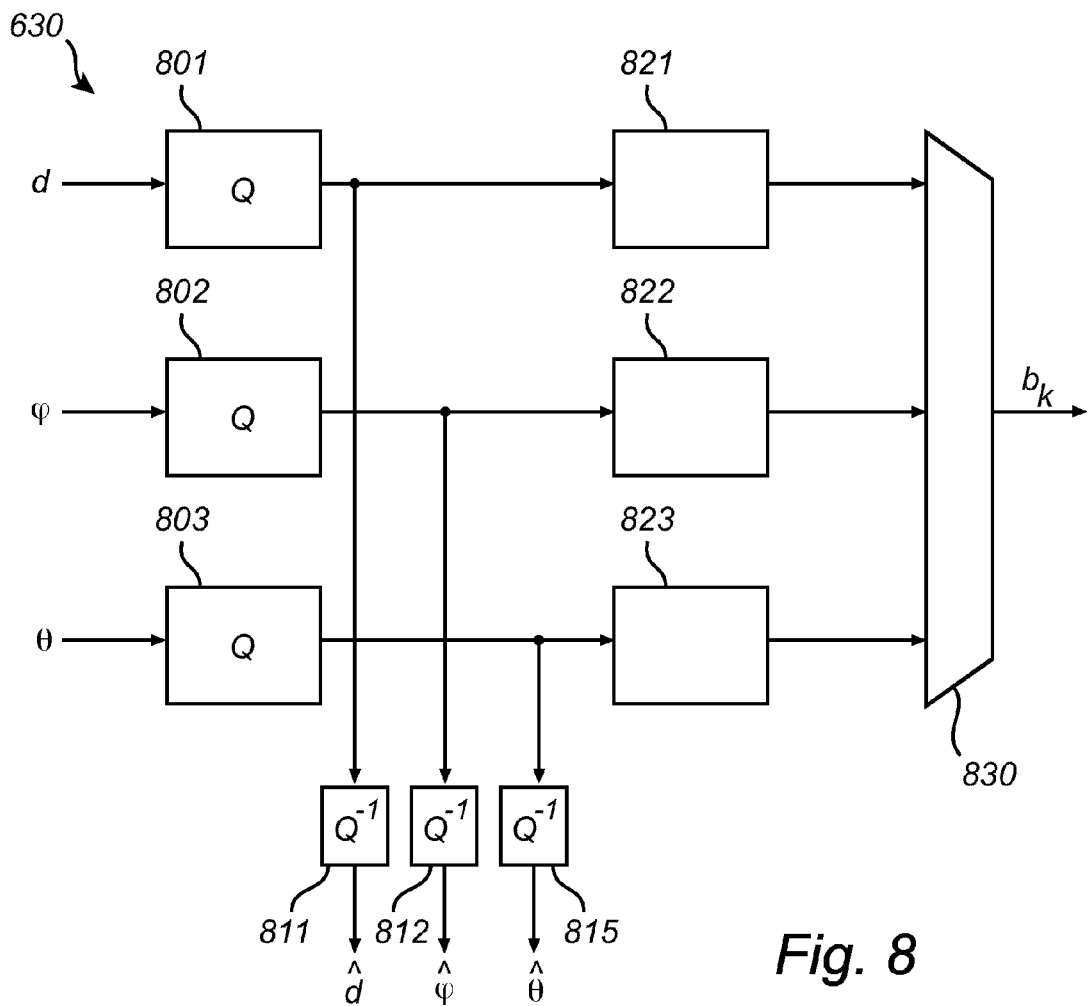
FIG. 8 shows a detail of an audio encoding system, more precisely a section of the spatial analyzer, which provides quantized decomposition parameters by conversion into a quantized format followed by restoration.

Advantageously but not necessarily, the decomposition parameters $\hat{d}, \hat{\phi}, \hat{\theta}$ which the adaptive rotation stage 106 in the audio encoding system 100 of FIG. 1 receives are quantized. This enables faithful decoding, since the decoder-side will, as a result of digital storage or data transfer, operate on quantized values of the decomposition parameters; if the adaptive rotation stage on the encoder side is controlled by quantized values, it will use information identical to the one on which a corresponding inverse component on the decoder side bases its computation of the inverse of the orthogonal transformation. Rounding errors may otherwise degrade the accuracy. FIG. 8 illustrates a possible implementation of a quantization process, to be included either as a portion of the spatial analyzer 103 or a separate component. Quantizers 801, 802, 803 convert non-quantized decomposition parameters $d, \phi, \theta$ into quantization indices associated with predefined quantization levels; this step may include simple rounding, which amounts to quantization subject to minimizing the rounding error, or quantization subject to minimizing the square of the rounding error. The quantization indices are converted back into non-quantized format by inverse quantizers 811, 812, 813, that is, into the quantization level indicated by a respective quantization index. The outputs $\hat{d}, \hat{\phi}, \hat{\theta}$ from the inverse quantizers 811, 812, 813 are supplied to the adaptive rotation stage 106

In a different processing branch, encoders 821, 822, 823 together with a multiplexer 830 convert the quantization indices into encoded format $b_K$, which is ready to be integrated in the output bitstream B of the encoding system 100. In this case, the multiplexer 110 described previously need not quantize the decomposition parameters.

FIG. 6 shows an implementation functionally similar to the one described in the preceding paragraph. Audio signals W, X, Y are supplied to an adaptive rotation stage 606 and, parallel thereto, to a spatial analyzer 603. The spatial analyzer 603 outputs the decomposition parameters $K=(d, \phi, \theta)$ at full resolution, which are used by a decomposition parameter encoder 630 to produce quantization indices in encoded format $b_K$ and quantized decomposition parameters $\hat{K}=(\hat{d}, \hat{\phi}, \hat{\theta})$. A possible internal structure of the parameter encoder 630 is shown in FIG. 8. After a decoding process, the encoded quantization indices will return values identical to the quantized decomposition parameters $k=(\hat{d}, \hat{\phi}, \hat{\theta})$, which may differ from the decomposition parameters $K=(d, \phi, \theta)$ at full resolution for reasons of rounding. A parameter-to-matrix converter 631 provides the matrix $V(\hat{d}, \hat{\phi}, \hat{\theta})$ to be used by the adaptive rotation stage 606.

Figure 7:
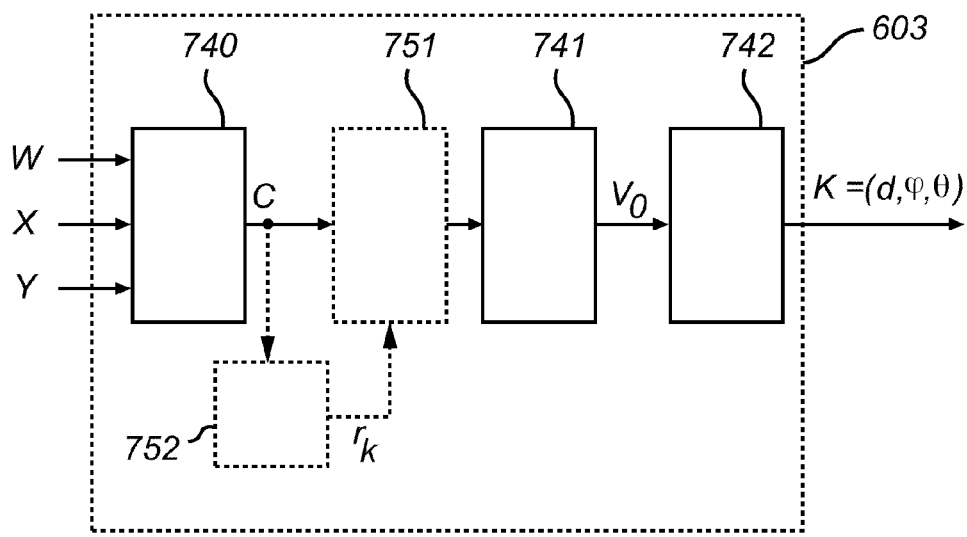
FIG. 7 shows a detail of an audio encoding system, more precisely a spatial analyzer performing an eigen-analysis based on signal covariances.

FIG. 7 describes in more detail how a spatial analyzer 603 may be implemented based on an eigen-analysis approach. A covariance analyzer 740 computes covariances of all pairs of signals in the current time block or time frame, and forms the matrix $$C = \begin{bmatrix} Cww & Cwx & Cwy \\ Cxw & Cxx & Cxy \\ Cyw & Cyx & Cyy \end{bmatrix}.$$

A diagonalizing unit 741 receives the matrix C, diagonalizes the matrix and returns an eigenvector matrix $V_0$ at full accuracy, in which the eigenvectors are ordered according to decreasing eigenvalues. A parameterizing unit 742 represents the eigenvector matrix $V_0$ as the matrix $V(d, \phi, \theta)$ defined above. To this end, the parameterizing unit 742 may apply sign flips of individual eigenvectors. Additionally, the application of the mappings $R_1$ and $R_2$ (which are introduced below) may be described as reorderings the second and third eigen-signals. Via the above formula, the matrix V is uniquely determined by the vector $K=(d, \phi, \theta)$ of decomposition parameters. As already discussed, the decomposition parameters may be replaced by quantized decomposition parameters, and the matrix $V(d, \phi, \theta)$ may be replaced by an analogous but approximating matrix $V(\hat{d}, \hat{\phi}, \hat{\theta})$ evaluated for the quantized decomposition parameters. The eigenvector matrix $V_0$ may be represented by the matrix $V(\hat{d}, \hat{\phi}, \hat{\theta})$ from the outset at least if the parameterizing unit 742 has access to the quantization levels to be applied.

In an alternative implementation, the spatial analyzer 603 further comprises a filter 751 for smoothing a covariance matrix in a sequence of covariance matrices computed on the basis of frame-wise values of the audio signals W, X, Y. A controller 752 is arranged to control certain quantitative properties of the filter 751, e.g., by supplying a frame-wise value of a feedback parameter $r_k$. The filter 751 may include a memory allowing storage of one or more covariance matrices relating to previous frames, on which the filter 751 bases its computation of a smoothed covariance matrix for a current frame.

Figure 19A:
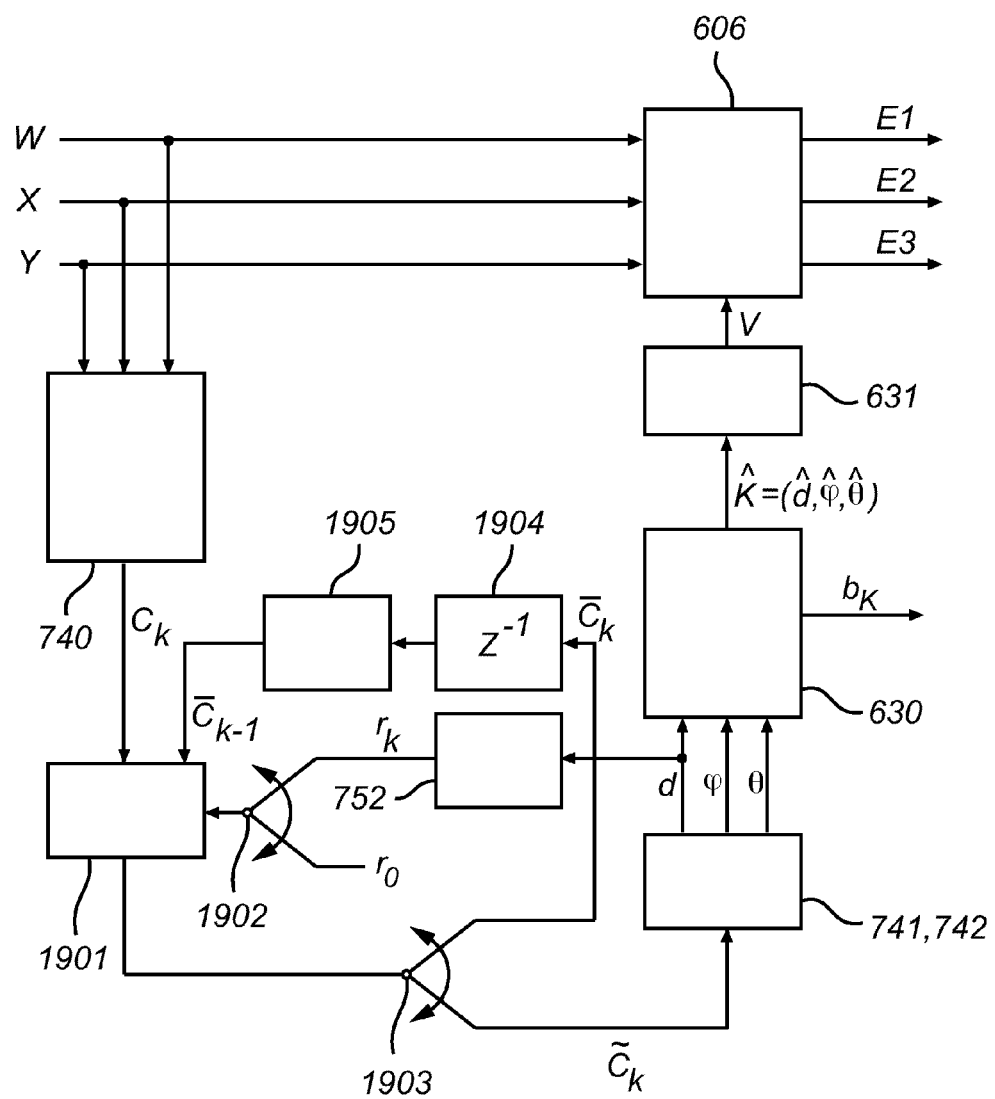
FIG. 19 shows two implementations of a detail of an audio encoding system, more precisely a spatial analyzer supplying quantized decomposition parameters to an adaptive rotation stage, which differs from that shown in FIG. 6 in that it applies smoothing to consecutive covariance matrices derived from the signals to be encoded.
Figure 19B:
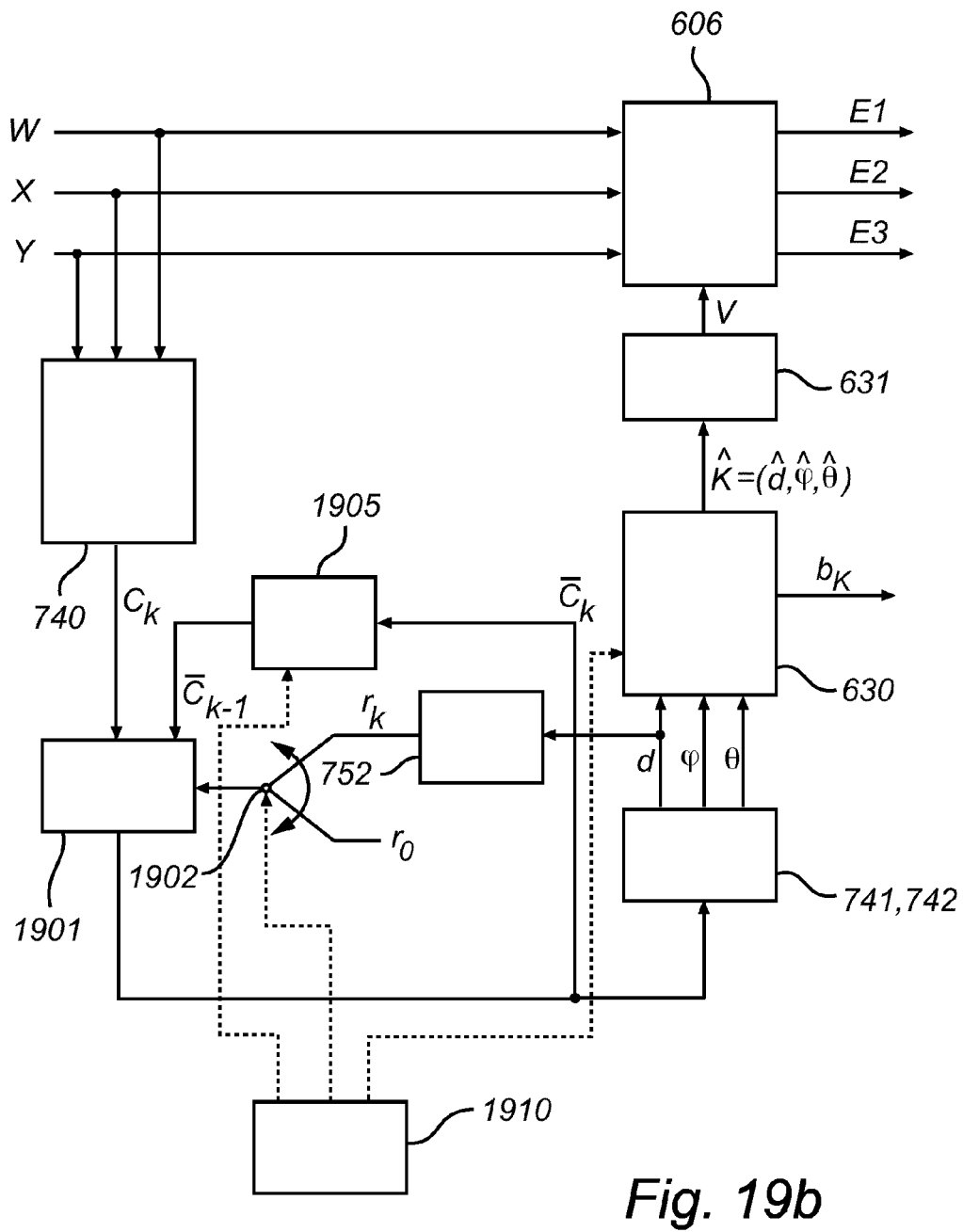

FIGS. 19*a* and 19*b* show detailed implementations of the covariance smoothing functionality of the spatial analyzer 603. FIGS. 19*a* and 19*b* include functional components which are similar or identical to those in FIGS. 6 and 7. For additional information on these components, reference is made to the description of said two figures, in which the components are identified by like reference numbers.

A first implementation is shown in FIG. 19*a*. In a first phase, selectors 1902, 1903 are in the lower position and the covariance analyzer 740 computes a covariance matrix $C_k$ for the $k^{th}$ frame. A filter 1901 controlled by the default smoothing coefficient $r_0$, which is output of the first selector 1902, and further receives inputs from the covariance analyzer 740 and a delay buffer 1904, 1905 (delayed by one frame), forms the convex combination $$\tilde{C}_k = r_0 \overline{C_{k-1}} + (1-r_0) C_k.$$

The result is supplied to the combined diagonalizing/parameterizing unit 741, 742, in which it is used to derive the decomposition parameters. Guided by the first decomposition parameter d, the controller 752 computes an adapted smoothing coefficient $r_k$ specific to this frame. The controller 752 may function in accordance with a positive correlation between the adapted smoothing coefficient $r_k$ and the first decomposition parameter d (directivity-controlling parameter) in the $k^{th}$ frame. When the adapted smoothing coefficient $r_k$ has been computed, a second phase is entered, wherein the selectors 1902, 1903 are switched to the upper position. The filter 1901 now receives the adapted smoothing coefficient $r_k$ and computes a smoothed covariance matrix for the $k^{th}$ frame, namely:

$$\overline{C_k} = r_k \overline{C_{k-1}} + (1-r_k) C_k.$$

The smoothed covariance matrix $\overline{C_k}$ is read into the delay buffer 1904, 1905 for use in corresponding computations relating to the $(k+1)^{th}$ frame. It is noted that the smoothed covariance matrix $\overline{C_k}$ is not used to compute the decomposition parameters and eventually the eigenvector matrix V.

FIG. 19*b* shows an implementation similar to that in FIG. 19*a* by differing from this by the absence of the second selector 1903 and the delay stage 1904, and by the presence of a control section 1910 responsible for operating the first selector 1902, the buffer 1905 and the parameter encoder 630. The control section 1910 may be programmed as per below Table 1.

TABLE 1

|  | 1902 | 1905 | 630 |
| --- | --- | --- | --- |
| First phase | Supply default smoothing parameter $r_0$ | — | — |
| Second phase | Supply adapted smoothing parameter $r_k$ | Read output value of filter 1901 | Use decomposition parameters to compute $\hat{K}$ and $b_K$ |

With the above notation, the output during the first phase from the filter 1901 is $\tilde{C}_k$, and during the second phase it is $\overline{C_k}$. Hence, for each time frame, the decomposition parameters are computed twice: once for finding the adapted smoothing coefficient $r_k$, and once with the purpose of finding a smoothed covariance matrix, from which the eigenvalue matrix V will be derived. As the drawing suggests, it is the second version of the decomposition parameters (the one based on $\overline{C_k}$) that will control the rest of the coding process, more precisely, via the eigenvalue matrix V which governs the energy-compacting orthogonal transformation by which the audio signals are decomposed.

Common to both implementations, the smoothing coefficients are numbers comprised between 0 and 1. Routine experimentation can be used to find suitable values of the default smoothing parameter and a relationship between directivity parameter and the adapted smoothing parameter. The default smoothing coefficient $r_0$ preferably is less than or equal to the adapted smoothing coefficient $r_k$. For instance, one may set $r_0 = 0.1$ and apply an affine mapping of the directivity parameter d from an expected interval $(d_{low}, d_{high}) = (0.5, 0.9)$ to $(r_0, r_{max}) = (0.1, 0.9)$.

In this disclosure, unless otherwise indicated, the decomposition parameters are defined in the following closed intervals:

$$d \in [0,1], \phi \in [-\pi, \pi], \theta \in [-\pi, \pi].$$

Figure 9:
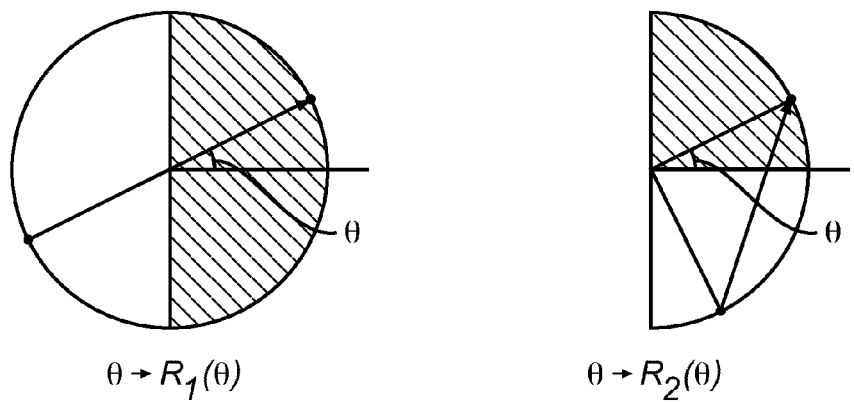
FIG. 9 illustrates a variable transformation enabling more efficient coding of one of the decomposition parameters.

FIG. 9 shows two transformations to be applied to the third decomposition parameter θ in order to achieve more efficient coding. More precisely, each of the two transformation to be described is known to be neutral to the continued processing. This way, it may be assumed that the third decomposition parameter assumes values only in a restricted interval, which can be encoded more accurately at a given coding bit budget than a longer interval. A first mapping $R_1(\theta) = \theta + \pi$ will correspond to an eigenvector matrix $V(d, \phi, R_1(\theta))^T$ with identical linear span (column space) as the original matrix $V(d, \phi, \theta)^T$. As shown in the left subfigure, the respective images of the third and second quadrants are the first and fourth quadrants, so that any $\theta \in [-\pi, \pi]$ may be encoded as $\theta \in [-\pi/2, \pi/2]$. A second mapping $R_2(\theta) = \theta + \pi/2$ returns a matrix $V(d, \phi, R_2(\theta))^T$ differing from $V(d, \phi, \theta)^T$ only in the ordering of the two last columns and a sign flip. This is of course inconsequential to the subsequent coding. As shown in the right subfigure, any value in the fourth quadrant can be mapped to the first quadrant if needed.

In one example embodiment, $R_1^+(\theta) = \theta + \pi$ is applied if $\partial < -\pi/2$, and $R_1^-(\theta) = \theta - \pi$ if $\theta > \pi/2$. Further, if any of $R_1^+$ or $R_1^-$ has been applied and additionally the result is negative, that is, $R_1^+(\theta) < 0$ or $R_1^-(\theta) < 0$, then $R_2(\theta) = \theta + \pi/2$ is applied to the result; geometrically, this amounts to shifting the result counter-clockwise by a right angle.

FIG. 2 shows a noise level computing section 201 which derives the noise offset No from the coding bit budget Bud and the spectral envelope Env of the signal to be encoded. Only transform coefficients in such subbands for which the spectral envelope exceeds the noise profile resulting from the noise offset No are included in the subband collections (and eventually encoded in the output bitstream B). The noise level computation section 201 may additionally determine the noise offset No using a standard or modified reverse water filling algorithm. Water filling algorithms are generally known in the art. They may be used to find a noise offset No which corresponds to a noise profile that is optimally placed in the sense that a (substantial) further reduction of the noise offset No would have exceeded the coding bit budget. Depending on the nature of the particular water filling algorithm, particularly if it is adapted for use with entropy-constrained quantization of the transform coefficients, the noise level computing section 201 may additionally take the values of the transform coefficients of the rotated audio signals E1, E2, E3 into account, as FIG. 2 suggests.

For instance, such a water filling algorithm may try different values of the noise offset No to find the one where the largest quantity of bits from the available budget is actually spent. After defining a candidate noise offset value to try, the method selects quantizers for all frequency subbands of the rotated audio signals, based on the local relationship between the spectral envelope and the noise profile (either of which may have undergone rescaling). The method then assesses in what subbands the spectral envelope Env is greater than the noise profile, activates these quantizers out of the selected ones. The subbands where this inequality is fulfilled constitute the subband collection for each rotated audio signal. From this, the method obtains both the subband collections, the quantized values of the transform coefficients and an indication of the quantizers used, as well as the total coding cost for this frame. By comparing the coding cost to the available coding bit budget Bud, the method may establish whether a further noise offset No candidate value must be tried. If not, the current noise offset value No is considered the final one, and the subband collections, quantizer selections and quantized values are forwarded for subsequent processing, after which the method may proceed to the next frame.

FIG. 12 illustrates in greater detail how the rate allocation process may be implemented, wherein it will return the noise profile as a constant function of the subbands. The horizontal axis of the diagram in the upper portion of FIG. 12 indicates consecutive frequency subbands (numbered from 1 to n) for the first rotated audio signal E1, followed by subbands from the second rotated audio signal E2 and subbands from the third rotated audio signal E3. In the diagram, the solid line indicates the spectral envelope, whereas the broken line $L_0$ indicates the constant value of the noise profile. The uniform rate allocation criterion is that subbands in which the spectral envelope (or a peak in the spectral envelope) is greater than the noise profile will be included in the subband collection for the rotated audio signal concerned. The lower portion of FIG. 12 illustrates how the value $L_c$ of the noise profile is computed. More precisely, the rotated audio signals E1, E2, E3 are supplied to an spectral envelope analyzer 1201, which computes spectral envelopes $\hat{s}_1, \hat{s}_2, \hat{s}_3$ for each signal. In a spectral combining section 1202, the spectral envelopes $\hat{s}_1, \hat{s}_2, \hat{s}_3$ are concatenated (as indicated on the horizontal axis of the diagram) into a super-envelope $\hat{s}$. The super-envelope $\hat{s}$ plays the role as the envelope Env referred to above. A noise level computing section 1203 receives the super-envelope $\hat{s}$ and the coding bit budget Bud, and is configured to output a noise offset value $L_0$ which approximates the minimum of the noise profile values for which the coding bit budget is sufficient in view of the super-envelope. If uniform quantization is used and the encoding cost is Bud/p for each frequency subband, the minimum is close to that value $L_0$ for which the super-envelope exceeds $L_0$ in p subbands. The value $L_0$ of the noise profile may be updated for every time block or every time frame of the audio signals.

The rate allocation process illustrated in FIG. 12 may be further improved by rescaling the spectral envelope Env. FIG. 3 shows an example rescaling section 301 configured to output a rescaled spectral envelope Env' based on the spectral envelope Env provided by any of the spectral envelope analyzers 104, 1201. If such rescaling section 301 is provided between the spectral envelope analyzer 104 and the multichannel encoder 108 in FIG. 1, the rescaled spectral envelope Env' replaces the original spectral envelope Env as input to the multichannel encoder 108.

Figure 14:
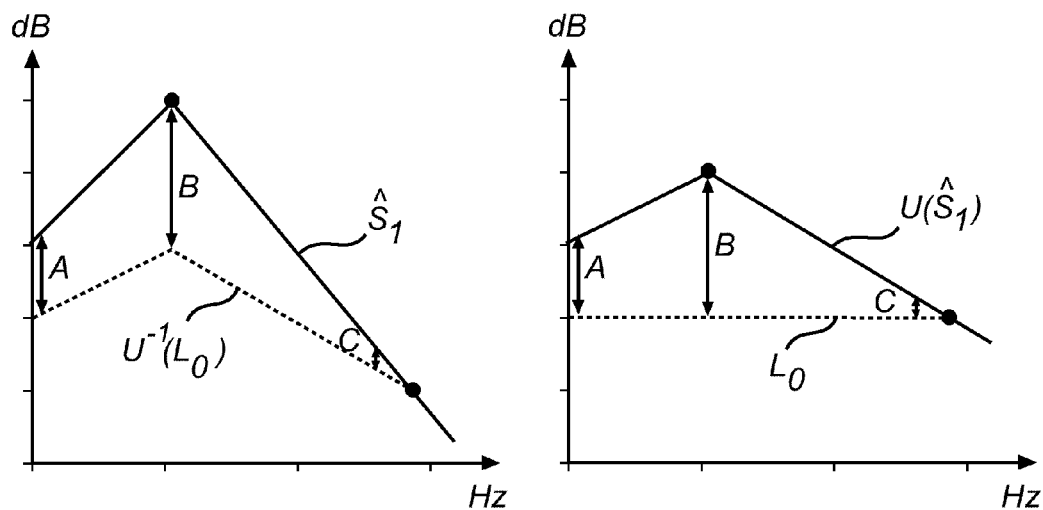
FIG. 14 shows a simplified example of a noise profile rescaling operation to be practised in connection with the bit allocation process.

The rescaling of the spectral envelope may proceed as schematically illustrated in FIG. 14. As already discussed, the rescaling may be an exponential mapping applied to signal values in linear units, which corresponds to a rescaling of signal values in logarithmic units by a constant factor β. The improvement resides in the fact that the rescaled spectral envelope is perceptually comparable to a constant noise profile, which may enable perceptually more pleasing rate allocation. In the left subfigure, a perceptually weighted noise profile $U^{-1}(L_0)$ is plotted in broken line together with a portion $\hat{s}_1$ of the envelope Env in solid line. Accordingly, the noise profile $U^{-1}(L_0)$ is relatively higher in louder subbands than in quieter subbands. The right subfigure shows the same data, however after perceptual rescaling by a mapping U, which maps the frequency-varying noise profile to a constant function $L_0$. The portion $\hat{s}_1$ of the super-envelope Env has been flattened. It is important to note that the mapping U preserves the difference in logarithmic units (dB) between noise and envelope values for each given frequency, as indicated by the distances A, B, C.

Figure 13:
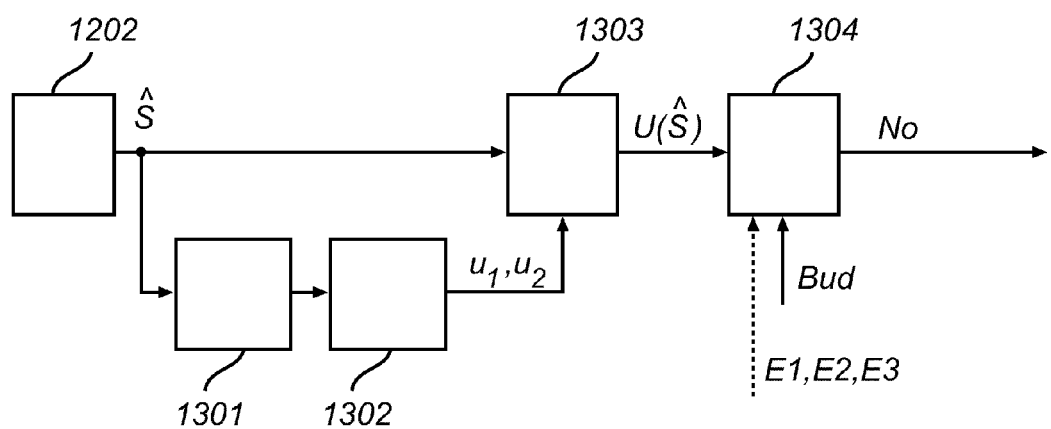
FIG. 13 shows a structure for rescaling the spectrum in such manner that it becomes comparable with the noise profile.

The spectral envelope rescaling technique can be practised using the structure shown in FIG. 13, which shows the spectral combining section 1202 of FIG. 12 together with functional sections arranged downstream thereof. More precisely, based on the super-envelope from the combining section 1202, a variance estimator 1301 computes variances of subbands in the super-spectrum. Based on the output of the variance estimator 1301, a rescaling configuration section 1302 determines one or more rescaling parameters $u_1$, $u_2$, etc. The rescaling parameters may be the constant rescaling factor β referred to above, to be applied to super-envelope points in logarithmic units. Based on the rescaling parameters $u_1$, $u_2$, a rescaling section 1303 rescales the super-envelope to return a rescaled super-envelope UM, which is further supplied to a noise computing section 1304, which outputs the noise offset No by comparing candidate values of the noise offset with the rescaled super-envelope $U(\hat{s})$ and further taking a coding bit budget Bud into account. Optionally, the noise computing section 1304 additionally considers the transform coefficients of the rotated signals E1, E2, E3. It is noted that FIG. 13 shows an implementation of a spectral combining section 1202 capable of signal-adaptive rescaling. Some of the components visible in FIG. 13 may be omitted if a fixed rescaling is deemed acceptable. For instance, the variance estimator 1301 and/or the rescaling configuration section 1302 need not form part of the spectral combining section 1202.

Figure 16:
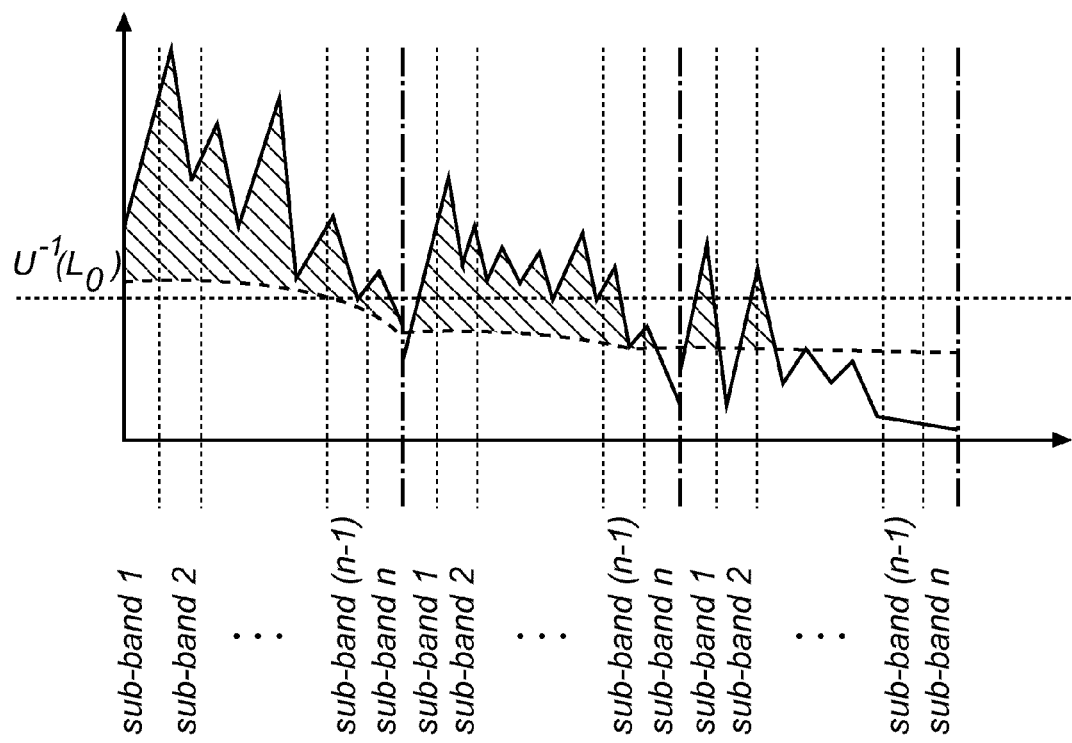

FIG. 16 is similar to the upper portion of FIG. 14. The horizontal axis corresponds to frequency subbands of each of the rotated signals E1, E2, E3. The super-envelope is drawn by solid line, and the noise profile $U^{-1}(L_0)$ by broken line. The noise profile is frequency-dependent because the perceptually justified rescaling $U^{-1}$ is. The hatched area between the super-envelope and the noise profile $U^{-1}(L_0)$ corresponds to the size of the data set to be encoded after the rate allocation process. The data set is reduced compared to the set of transform coefficients through the fact that not all subbands (in the example shown in FIG. 16) are selected for a subband collection.

Figure 10A:
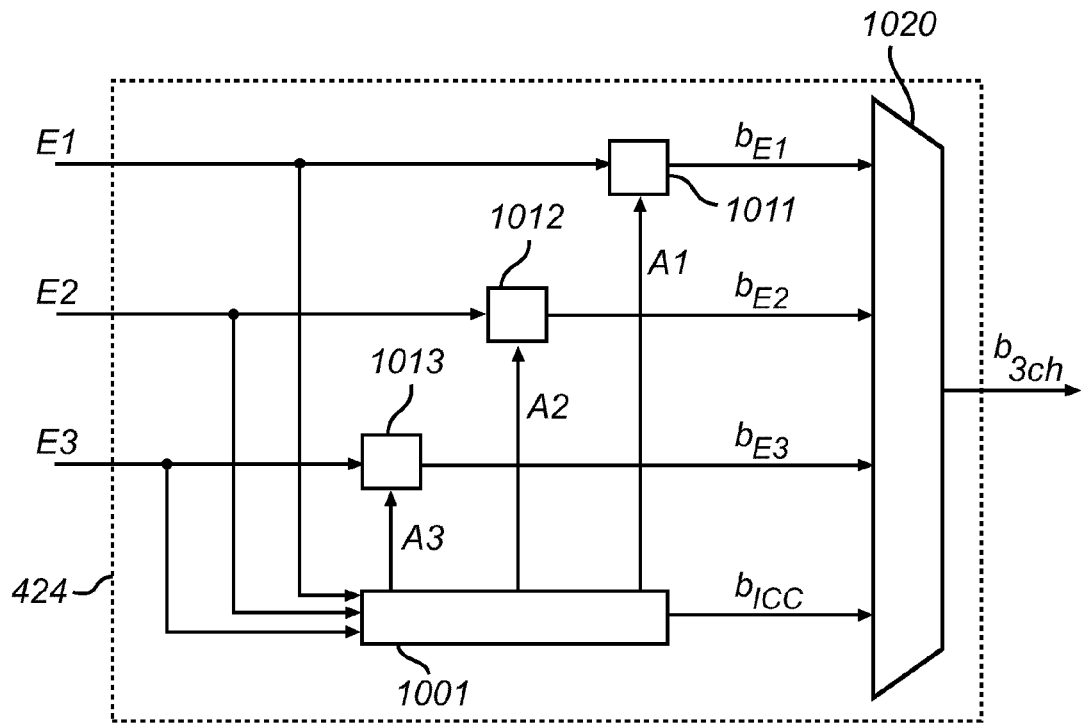
FIG. 10 illustrates two alternative implementations of a multichannel encoder in an audio encoding system, which is configured to encode the rotated audio signals jointly.
Figure 11:
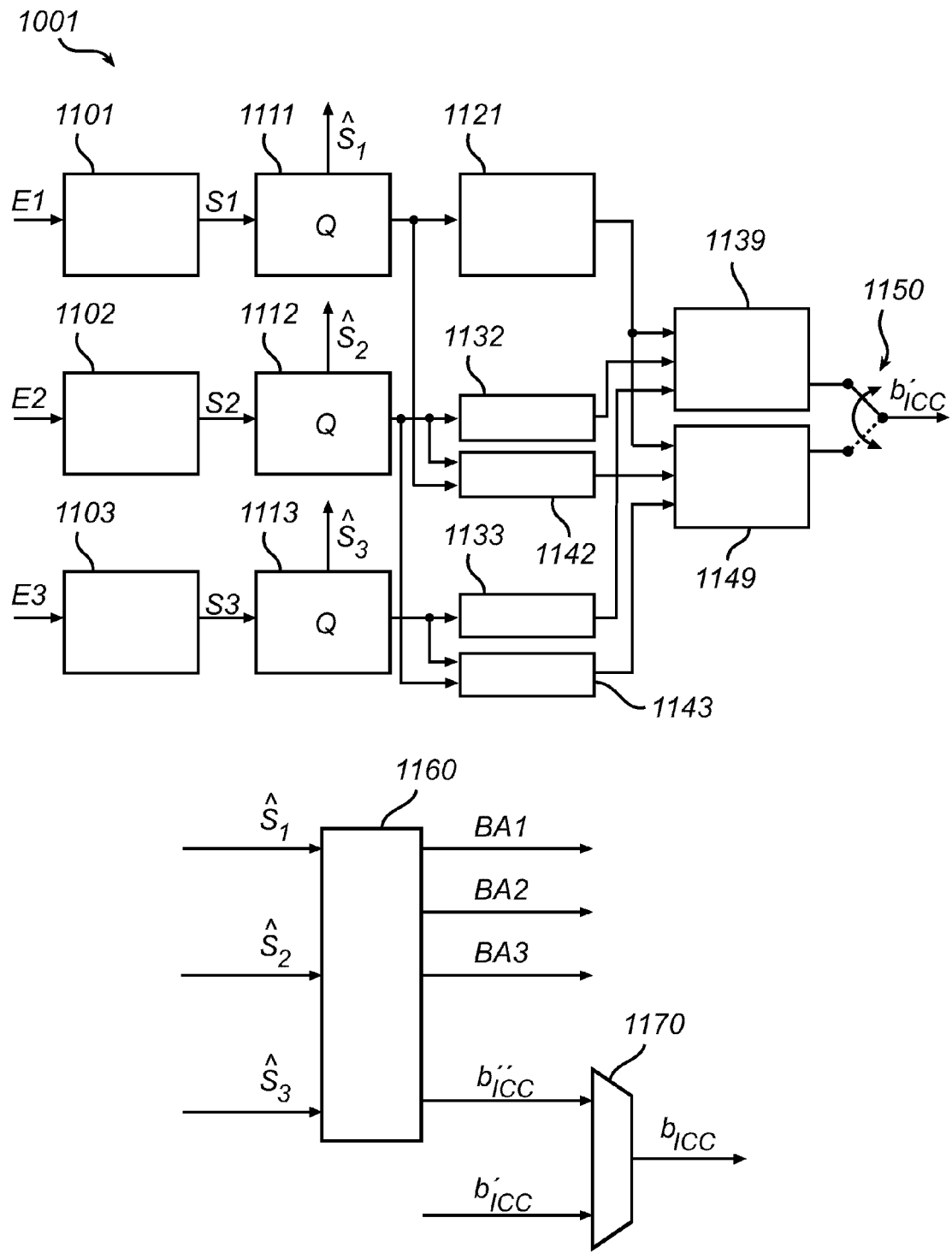
FIG. 11 illustrates a detail of the multichannel encoder in FIG. 10, more precisely the inter-channel coding section.

FIGS. 10a and 11 show a possible internal structure of the multichannel encoder 425. In FIG. 10a, frequency-domain representations of the rotated audio signals E1, E2, E3 are encoded by one-channel encoders 1011, 1012, 1013, which are however controlled in a joint fashion by an inter-channel coding section 1001, which receives the rotated audio signals E1, E2, E3 in parallel. The inter-channel coding section 1001 causes each of the one-channel encoders 1011, 1012, 1013 to output some of the transform coefficients in the frequency-domain representations. The inter-channel coding section 1001 is further operable to cause a one-channel encoder to discard transform coefficients in certain subbands. The inter-channel coding section 1001 may provide control signals A1, A2, A3 to the one-channel encoders 1011, 1012, 1013 in the form of spectral envelopes and a noise offset No or noise profile, leaving for the one-channel encoders 1011, 1012, 1013 to make the actual decision for a given subband based in this information. The outputs of the one-channel encoders 1011, 1012, 1013 are encoded transform coefficients of each of the rotated audio signals, which are forwarded to a multiplexer 1020. From the inter-channel coding section 1001, the multiplexer 1020 further receives encoded inter-channel metadata $b_{ICC}$, which it includes into an multichannel bitstream $b_{3ch}$.

Details of the inter-channel coding section 1001 are shown in greater detail FIG. 11. At the input side, one-channel spectral envelope computing sections 1001, 1002, 1003 provide spectral envelopes $s_1$, $s_2$, $s_3$ of the type introduced above, however at full accuracy. Quantizers 1111, 1112, 1113 return quantized spectral envelopes $\hat{s}_1$, $\hat{s}_2$, $\hat{s}_3$, the values of which are identical to predefined quantization levels; similarly to the technique utilized for the decomposition parameters d, $\phi$, $\theta$; this may be achieved by consecutive encoding into and decoding from a quantized format. The spectral envelope analyzer 104 in FIG. 1 may be considered functionally similar to the combination of the spectral envelope computing sections 1101, 1102, 1103 and the quantizers 1111, 1112, 1113.

Continuing for now in the upper portion of FIG. 11, the quantized spectral envelopes $\hat{s}_1$, $\hat{s}_2$, $\hat{s}_3$ undergo differential coding on an inter-subband basis and an inter-channel basis. For this purpose, there is provided, downstream of the quantizers 1111, 1112, 1113: a combined frequency-differential and channel-differential encoder 1121 receiving the output from the first quantizer 1111; two frequency-differential encoders 1132, 1133 receiving the respective outputs of the second and third quantizers 1112, 1113; and two channel-differential encoders 1142, 1143 receiving the respective outputs of the second and third quantizers 1112, 1113. The outputs of the quantizers 1111, 1112, 1113 may be the spectral envelopes in an encoded format, which conveys only signal values identical to predefined quantization levels. The outputs of all frequency-differential encoders 1121, 1132, 1133 are collected at a first multiplexer 1139, and the outputs of all channel-differential encoders 1142, 1143 are connected at a second multiplexer 1149. A selector 1150 enables the currently most efficient one of frequency- and channel-differential coding to be chosen as first metadata $b'_{ICC}$. Each of frequency- and channel-differential coding is a type of joint encoding of the spectral envelopes.

The lower portion of FIG. 11 shows further components of the inter-channel coding section 1001. In fact, the quantized spectral envelopes $\hat{s}_1$, $\hat{s}_2$, $\hat{s}_3$ are supplied to a rate allocation section 1160, which outputs, based thereon, decisions BA1, BA2, BA3 indicating the subband collections for each of the signals. It further outputs second metadata $b''_{ICC}$ comprising a noise offset No. A third multiplexer 1170 forms the stream of encoded inter-channel metadata $b_{ICC}$ based on the first $b'_{ICC}$ and second $b''_{ICC}$ metadata. It may be argued that the rate allocation section 1160 is functionally similar to the combination of sections 1202 and 1304 in FIG. 13 or to the combination of sections 1202, 1203 in FIG. 12 with the addition of a section (not shown) responsible for the decisions BA1, BA2, BA3. The inter-channel coding section 1001 may either (a) perform uniform quantization, wherein each subband is always encoded with the same number of bits, so that the set of available quantizers need only be stored in the one-channel encoders 1011, 1012, 1013. Alternatively, the inter-channel coding section 1001 may (b) perform adaptive quantization, wherein both itself and the one-channel encoders 1011, 1012, 1013 are required to have knowledge about the available quantizers.

Figure 10B:
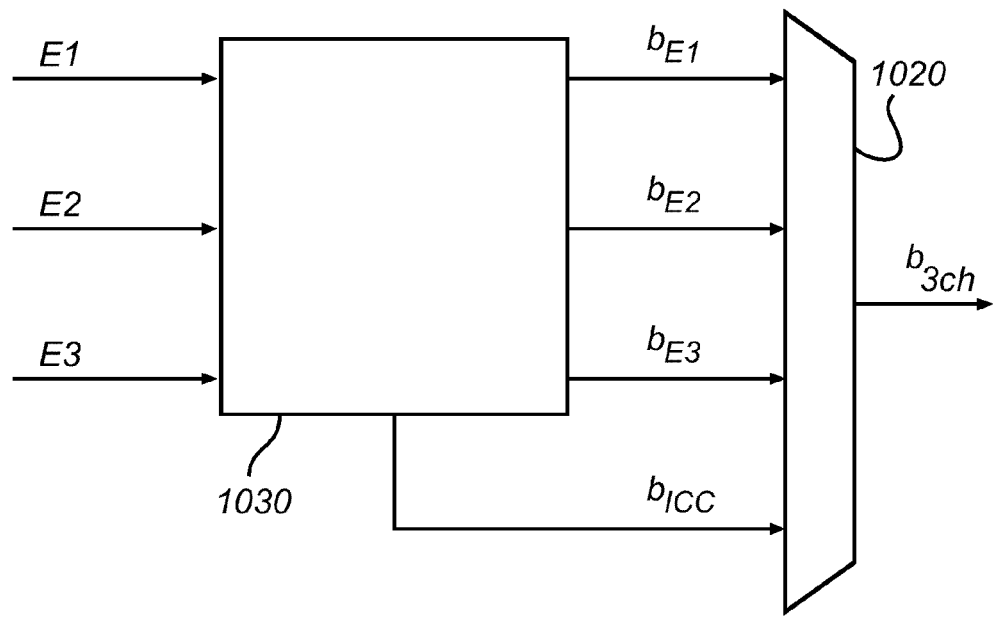

FIG. 10b shows a multichannel encoder 1030 in which the signal-adaptive selection of quantizers for respective subbands and the determination of the subband collection (as expressed by the noise offset No value, which is included in the multichannel bitstream $b_{3ch}$ together with the spectral envelope, cf. FIG. 11) in which transform coefficients are transmitted are performed in a joint rate allocation process. Indeed, after the noise shape and spectral envelope have been determined (e.g., based on the transform coefficients of the rotated audio signals), the rate allocation process begins with determining an initial value (or initial guess) of the noise offset. A noise profile is obtained by adding the noise offset to the noise shape. Based on a criterion involving the noise profile and the spectral envelope Env (the criterion will be described below, inter alia in connection with FIG. 20b), the encoder 1030 assigns a quantizer to each frequency subband in each rotated audio signal. Those frequency bands which according to the noise-to-envelope comparison will not be included in the subband collection are assigned a one-level quantizer; in other words, they are assigned zero rate. By quantizing the transform coefficients of the rotated audio signals in accordance with the noise-to-envelope comparison and the assignment of quantizers, the encoder 1030 obtains a total coding cost, apparently in addition to the quantized (encoded) transform coefficients $b_{E1}$, $b_{E2}$, $b_{E3}$. If the coding cost is acceptable in view of the coding budget (i.e., sufficiently close to the upper limit of the budget), then the quantized transform coefficients $b_{E1}$, $b_{E2}$, $b_{E3}$ and the quantizer assignment (in the subbands forming part of the subband collection) are considered final and are output by the encoder 1030. If the coding cost is not in the acceptable range, the noise offset value is updated and the process is repeated. Not all substeps need be repeated; for instance, while the assignment of quantizers to subbands is renewed for each noise offset value, the noise shape is independent of the noise offset and need not be recalculated after an update of the noise offset.

Figure 20A:
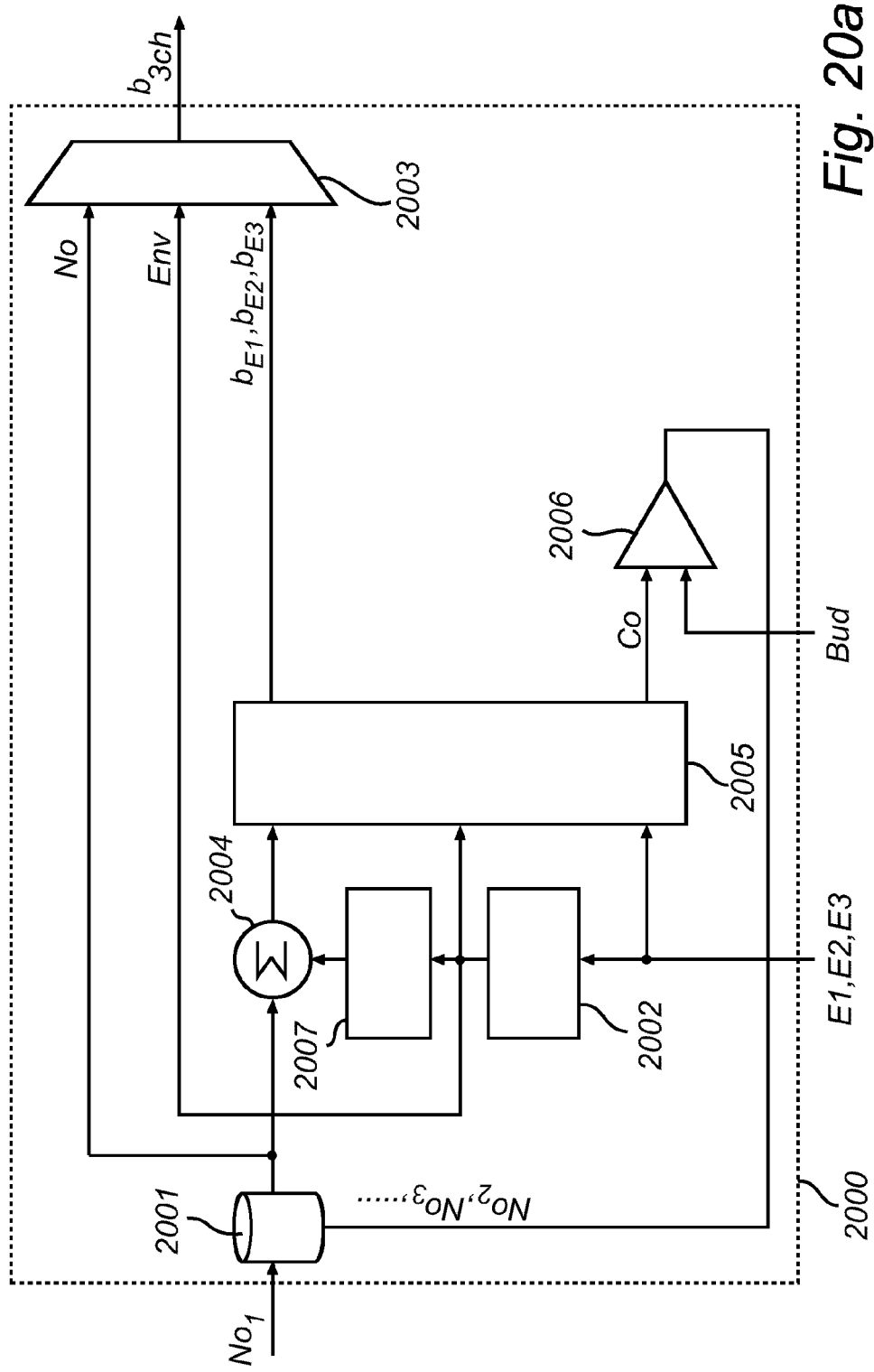
FIG. 20 shows a further possible implementation of a multichannel encoder in an audio encoding system according to an example embodiment of the invention.

FIG. 20 illustrates in more detail how a rate allocation process of the type described in connection with FIG. 10b may be implemented. As shown in FIG. 20a, for each time frame, a multichannel encoder 2000 accepts as input an initial guess $No_1$ of the noise offset, transform coefficients of the rotated audio signals E1, E2, E3 and the coding budget Bud. The initial guess $No_1$ is initially stored in noise offset memory 2001. From the transform coefficients, a spectral envelope analyzer 2002 computes a quantized spectral envelope Env, which is supplied to each of a quantizer 2005, an output multiplexer 2003 and a noise shape computing section 2007. The noise shape computing section 2007 computes a noise shape, which the adder 2004 adds to the noise offset from the noise offset memory 2001, so that a noise profile is obtained and supplied to the quantizer 2005. Furthermore, the transform coefficients of the rotated audio signals E1, E2, E3 are supplied to the quantizer 2005, which outputs quantized transform coefficients $b_{E1}$, $b_{E2}$, $b_{E3}$ as well as a coding cost Co for the initial guess $No_1$.

Figure 20B:
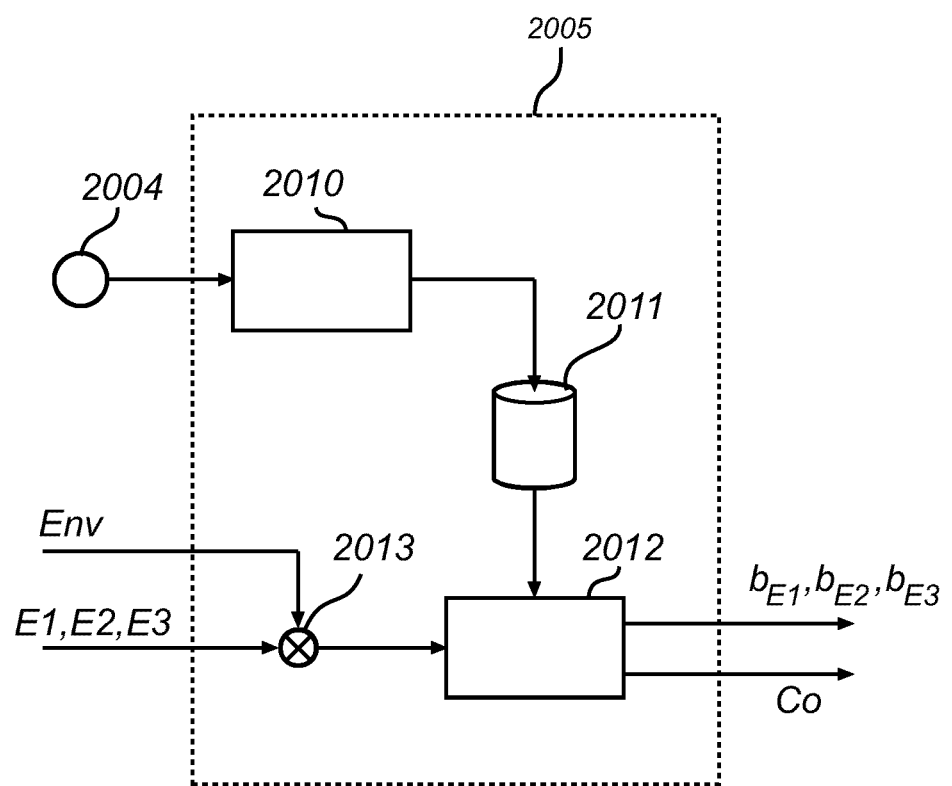

A possible implementation of the quantizer 2005 is shown in FIG. 20b.

Memory 2011 stores a collection of M quantizers, which may have uniform or nonuniform quantization step size. Each quantizer has an associated distortion. If a quantizer is uniform, its associated distortion is determined by its step size, as is well known in the art. A quantizer selector 2010 operates as follows. For each subband, the quantizer selector 2010 maps the noise profile value, which is output by the adder 2004, to an integer i between 1 and M. The integer i indexes the quantizers in the collection of quantizers in the memory 2011. The quantizer selector 2010 preferably maps a noise profile value in a subband to a quantizer having a matching associated distortion. The quantization and entropy coding block 2012 takes the transform coefficients of the rotated audio signals E1, E2, E3, which a multiplier 2013 may optionally normalize by the super-envelope, and quantizes the transform coefficients using the quantizer identified by the integer i which has been computed by the quantizer selector 2010 for the concerned subband. Further, the quantized transform coefficients are entropy coded which produces binary code words bE1, bE2, bE3 representing each of the rotated audio signals E1, E2, E3, respectively. The cost Co is the sum of the number of bits in bE1, bE2, bE3.

Returning to FIG. 20a, a comparator 2006 compares the coding cost Co to the budget Bud. If the coding cost Co is not in the acceptable range, the comparator 2006 assigns a second guess $No_2$ to the noise offset and repeats the process. If necessary, the process is repeated for a third noise offset guess $No_3$ and possible further guesses until a suitable noise offset No is available. The second and further guesses can be computed a simple feedback approach based on the sign and magnitude of the deviation from the upper limit of the budget. When an acceptable noise offset value No has been found, the output multiplexer 2003 forms a multichannel bitstream $b_{3ch}$, in which additionally the spectral envelope Env and the quantized transform coefficients $b_{E1}$, $b_{E2}$, $b_{E3}$ are included. The multichannel bitstream $b_{3ch}$ need not include the explicit quantizer assignments if these are obtained by a deterministic method on the basis of the spectral envelope Env and the noise offset No. Indeed, if this is the case, the quantizer assignments can be reconstructed in an equivalent fashion on the decoder side.

Hence, summarizing inter alia FIGS. 2, 3, 12, 13, 14, 16 and 20, the rate allocation process may be based on one of the following uniform criteria, all of which are to be applied jointly to all subbands of the super-envelope ŝ:
a) A constant noise profile is computed based on the coding bit budget Bud and the super-envelope ŝ, by comparison with a super-envelope ŝ on the original scale.
b) A constant noise profile is computed similarly to option a) and is compared to a perceptually rescaled super-envelope U(ŝ).
c) A variable noise profile is computed based on the coding bit budget Bud and on subband-wise values of the super-envelope ŝ, wherein for example the noise profile is downscaled for louder subbands relative to quieter subbands.
d) Transform coefficients are pre-processed using a perceptual rescaling derived from the envelope Env and one of options a), b) and c) is performed. (Because the envelope Env is transmitted with the signal, a receiving decoder will be able to restore the original scale of the transform coefficients.)
e) Performing variable-rate coding (or entropy coding) by iteratively guessing a noise offset value No, assigning a quantizer to each subband, carrying out the quantization process in accordance with these assignments and the noise offset value, and comparing the resulting cost Co with the budget Bud.

This concludes the detailed description of example embodiments within the first aspect (encoding) of the present invention. Turning to the second aspect (decoding), FIG. 5 shows an adaptive audio decoding system 500. From an incoming bitstream B, a demultiplexer 571 extracts a multichannel bitstream $b_{3ch}$, decomposition parameters d, φ, θ, spectral envelope information Env and the noise offset No. The bitstream B may be prepared by an adaptive audio encoding system in accordance with the first aspect. Recalling the previous discussion on the use of quantized values on the encoder side, the decomposition parameters may originate from a quantizing process, but since this is not necessarily known to the decoding system 500, no assumption is made on this matter and neutral notation d, φ, θ is used.

Figure 18:
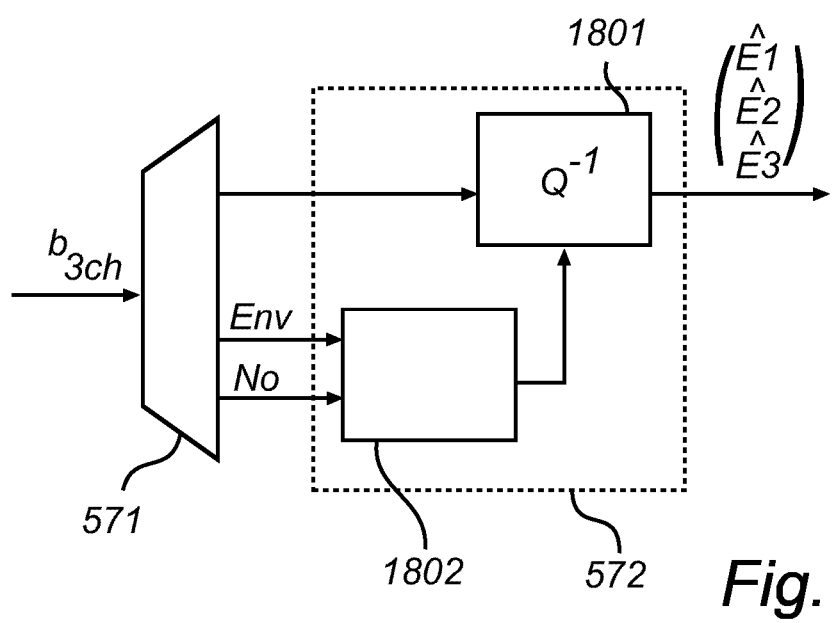
FIG. 18 shows a detail of an audio decoding system, more precisely a multichannel decoder, which is configured to restore audio signals on the basis of transform coefficients in some subbands and of a spectral envelope and a noise profile in other subbands.

A multichannel decoder 572 outputs, based on the multichannel bitstream $b_{3ch}$, the spectral envelope Env and the noise offset No, restored rotated audio signals Ê1, Ê2, Ê3. As FIG. 18 shows, the multichannel decoder 572 includes an inverse quantizer 1801 which outputs de-quantized transform coefficients of the restored rotated audio signals on the basis of the quantized transform coefficients $b_{E1}$, $b_{E2}$, $b_{E3}$ for the subband collection and a control signal supplied by controller 1802. The controller 1802 is configured to compute the noise profile based on the noise offset No and the spectral envelope Env. Preferably, the control signal contains relevant parts of the spectral envelope and other information that may support the synthesis of the subbands that are not included in the subband collection, as outlined above.

Continuing the description of FIG. 5, an adaptive rotation inversion stage 574 receives the decomposition parameters d, φ, θ, from which it derives coefficients for use in a linear combination of the restored rotated audio signals. The output of the adaptive rotation inversion stage 574 is de-rotated audio signals Ŵ, X̂, Ŷ. The coefficients in the linear combination may be proportional to the elements in an inverse of the matrix V(d, φ, θ) defined above. A post-processing stage 575 provides restored output audio signals (L̂, R̂, Ŝ) on the basis of the de-rotated audio signals Ŵ, X̂, Ŷ. The post-processing stage 575 may be configured to apply the inverse of the matrix P(h) defined above. If the coefficient h is variable, its value may be transmitted as part of the bitstream. A rendering section 576 supplies a drive signal to a non-essential, soundfield-enabled playback device 577 based on the restored output audio signals (L̂, R̂, Ŝ). The decoding system 500 further comprises a frequency-to-time transform arranged downstream of the multichannel decoder 572, such as in one of the locations indicated by reference signs 573, 578 and 579.

III. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. An adaptive audio encoding device, comprising:
    a spatial analyzer configured to receive a plurality of audio signals and to determine, based on the plurality of audio signals, frame-wise decomposition parameters;
    an adaptive rotation stage configured to receive said plurality of audio signals and to output at least a first, second, and third rotated audio signal obtained by an energy-compacting orthogonal transformation, wherein quantitative properties of the transformation are determined by the decomposition parameters;
    a spectral envelope analyzer configured to receive a frequency-domain representation of the rotated audio signals, which contains transform coefficients, and to output, based thereon, a spectral envelope; and
    a multichannel encoder configured to receive the frequency-domain representation of the rotated audio signals and to output transform coefficients of the first rotated audio signal only for frequency subbands in a first subband collection, transform coefficients of the second rotated audio signal only for frequency subbands in a second subband collection, and transform coefficients of the third rotated audio signal only for frequency subbands in a third subband collection, wherein any subbands not included in any subband collection are to be synthesized at decoding,
    wherein the multichannel encoder determines the first subband collection, the second subband collection, and the third subband collection by means of a rate allocation process based on a joint comparison of a noise profile for the rotated audio signals and the spectral envelopes of the rotated audio signals,
    wherein at least one of the spatial analyser, the adaptive rotation stage, the spectral envelope analyser, and the multichannel encoder, are implemented, at least in part, by one or more hardware elements of the adaptive audio encoding device.

2. The system of claim 1, wherein:
    the noise profile is based on a sum of a noise shape, which is fixed for a given frame, and a noise offset common to all rotated audio signals; and
    the rate allocation process includes varying the noise offset to approximate a coding bit budget.

3. The system of claim 2, wherein the rate allocation process includes computing a rate expense for a candidate noise offset on the basis of the transform coefficients of the rotated audio signals.

4. The system of claim 2, further comprising a noise level computing section configured to determine said noise shape on the basis of the spectral envelopes of the rotated audio signals, wherein the noise shape is allowed to vary on a subband basis.

5. The system of claim 1, further comprising a rescaling section configured to rescale the spectral envelope in such manner as to make it perceptually comparable to a noise profile, which is constant with respect to frequency.

6. The system of claim 1, wherein the spatial analyzer comprises a decomposition parameter encoder and is configured to supply the decomposition parameters to the adaptive rotation stage in quantized form.

7. The system of claim 1, wherein the spatial analyzer is configured to determine the decomposition parameters on the basis of an analysis frequency subrange of said plurality of audio signals.

8. The system of claim 1, further comprising a time-to-frequency transform stage arranged upstream of the spatial analyzer, said time-to-frequency transform stage being configured to receive a time-domain representation of at least one signal and to output, based thereon, a frequency-domain representation of the at least one signal.

9. The system of claim 8, wherein the time-to-frequency transform stage is arranged immediately upstream of the spatial analyzer.

10. The system of claim 8, wherein the adaptive rotation stage is configured to apply said orthogonal decomposition to a decomposition frequency subrange of said plurality of audio signals,
    said system further comprising a combining section configured to form the rotated audio signals by concatenating the result of the orthogonal transformation in the decomposition subrange and said plurality of audio signals outside the decomposition subrange.

11. The system of claim 1, further comprising a time-invariant pre-conditioning stage configured to output said plurality of audio signals based on an equal number of input audio signals.

12. The system of claim 11, wherein the input audio signals are obtainable by three angularly distributed directive transducers and the pre-conditioning stage is configured to output a linear combination of the input audio signals with coefficients proportional to the elements of the following matrix:

$$P(h) = \frac{1}{3} \begin{bmatrix} 2h & 2h & 2h \\ 2 & 2 & -4 \\ 2\sqrt{3} & -2\sqrt{3} & 0 \end{bmatrix},$$

where h is a finite positive constant.

13. An adaptive audio encoding method, comprising:
    determining frame-wise decomposition parameters on the basis of a plurality of audio signals;
    rotating the audio signals into at least a first, second, and third rotated audio signal using an energy-compacting orthogonal transformation, wherein quantitative properties of the transformation are determined by the decomposition parameters;
    computing a spectral envelope based on a frequency-domain representation of the rotated audio signals, which frequency-domain representation contains transform coefficients;
    determining a first, second, and third subband collection associated with a respective one of the first, second, and third rotated audio signals by means of a rate allocation process based on a joint comparison of a noise profile for all rotated audio signals and spectral envelopes of all rotated audio signals; and outputting transform coefficients of the first rotated audio signal only for frequency subbands in the first subband collection, transform coefficients of the second rotated audio signal only for frequency subbands in the second subband collection, and transform coefficients of the third rotated audio signal only for frequency subbands in the third subband collection, wherein any subbands not included in any subband collection are to be synthesized at decoding.

14. An adaptive audio decoding device, comprising:

a multichannel decoder configured to receive transform coefficients relating to a plurality of rotated audio signals and to output, based thereon, restored rotated audio signals;

an adaptive rotation inversion stage configured to receive decomposition parameters and the restored rotated audio signals and to output, based thereon, at least three de-rotated audio signals, wherein the adaptive rotation inversion stage computes an inverse of a decomposition matrix on the basis of the decomposition parameters and forms a linear combination of the restored rotated audio signals with coefficients proportional to the elements of said inverse, wherein at least one of the multichannel decoder and the adaptive rotation inversion stage, are implemented, at least in part, by one or more hardware elements of the adaptive audio decoding device.

15. The system of claim 14, wherein the multichannel decoder is configured to further receive a spectral envelope and a noise offset, and is adapted to detect frequency subbands for which transform coefficients are absent and to synthesize any such subbands in the restored rotated audio signals in accordance with a noise profile derived from the noise offset and the spectral envelope.

16. The system of claim 14, further comprising a time-invariant post-processing stage configured to provide, on the basis of the restored rotated audio signals, an equal number of restored output audio signals.

17. The system of claim 16, configured to produce restored output signals to be rendered by three angularly distributed directive audio sources, wherein the post-processing stage is configured to output signals obtained as a linear combination of the restored rotated signals with coefficients proportional to the elements of the inverse of the following matrix:

$$P(h) = \frac{1}{3}\begin{bmatrix} 2h & 2h & 2h \\ 2 & 2 & -4 \\ 2\sqrt{3} & -2\sqrt{3} & 0 \end{bmatrix},$$

where h is a positive constant.

18. The system of claim 14, further comprising a frequency-to-time transform stage arranged downstream of the multichannel decoder, said frequency-to-time transform stage being configured to receive a frequency-domain representation of at least one signal and to output, based thereon, a time-domain representation of the at least one signal.

19. The system of claim 18, wherein the frequency-to-time transform stage is arranged downstream of the adaptive rotation inversion stage, which is configured to form said linear combination of only a decomposition frequency subrange of the restored rotated audio signals, said system further comprising a combining section configured to concatenate the result of the linear combination in the decomposition subrange and the restored rotated audio signals outside the decomposition subrange.

20. The system of claim 18, wherein the frequency-to-time transform stage is arranged downstream of the adaptive rotation inversion stage, which is configured to form said linear combination independently for at least two distinct decomposition frequency subranges based on corresponding values of the decomposition parameters, said system further comprising a combining section configured to concatenate the result of the linear combination in the decomposition frequency subranges.

* * * * *